(12) United States Patent
Kataoka et al.

(10) Patent No.: US 12,612,100 B2
(45) Date of Patent: Apr. 28, 2026

(54) ELECTRIC POWER STEERING DEVICE

(71) Applicant: Mitsubishi Electric Corporation,
Tokyo (JP)

(72) Inventors: Nobuaki Kataoka, Tokyo (JP);
Nanami Saito, Tokyo (JP); **Takashi
Goto**, Tokyo (JP)

(73) Assignee: **MITSUBISHI ELECTRIC
CORPORATION**, Tokyo (JP)

( * ) Notice: Subject to any disclaimer, the term of this
patent is extended or adjusted under 35
U.S.C. 154(b) by 13 days.

(21) Appl. No.: 18/720,513

(22) PCT Filed: Nov. 29, 2022

(86) PCT No.: PCT/JP2022/043865
§ 371 (c)(1),
(2) Date: Jun. 14, 2024

(87) PCT Pub. No.: WO2023/153050
PCT Pub. Date: Aug. 17, 2023

(65) Prior Publication Data
US 2025/0042467 A1 Feb. 6, 2025

(30) Foreign Application Priority Data

Feb. 9, 2022 (JP) ................................. 2022-018566

(51) Int. Cl.
*B62D 5/04* (2006.01)
*B62D 6/00* (2006.01)
*H02P 21/22* (2016.01)

(52) U.S. Cl.
CPC ............. *B62D 5/0463* (2013.01); *B62D 5/04*
(2013.01); *B62D 5/046* (2013.01); *B62D 6/00*
(2013.01); *H02P 21/22* (2016.02)

(58) Field of Classification Search
None
See application file for complete search history.

(56) References Cited

U.S. PATENT DOCUMENTS 8,080,957 B2 * 12/2011 Miura .................... B62D 5/046
318/807
8,115,429 B2 * 2/2012 Ueda .................... H02P 25/024
318/400.03
(Continued)

FOREIGN PATENT DOCUMENTS

CN 105984492 A * 10/2016 ........... B62D 5/0469
EP 3069959 A1 * 9/2016 ........... B62D 5/0469
(Continued)

OTHER PUBLICATIONS

International Search Report (PCT/ISA/210) with translation and
Written Opinion (PCT/ISA/237) mailed on Feb. 7, 2023, by the
Japan Patent Office as the International Searching Authority for
International Application No. PCT/JP2022/043865. (8 pages).

*Primary Examiner* — Kevin R Steckbauer
(74) *Attorney, Agent, or Firm* — BUCHANAN,
INGERSOLL & ROONEY PC

(57) ABSTRACT

In a control device of an electric power steering device, a
q-axis current command value calculation unit which cal-
culates a current command value for a motor for producing
assist torque is provided with a q-axis current limitation
value calculation unit which calculates a q-axis current
limitation value such that, in a case where the absolute value
of a steering angle is equal to or greater than a predetermined
first steering angle threshold, the q-axis current limitation
value decreases with increase in the absolute value of the
steering angle, thereby restricting a q-axis current command
value. Thus, a steering operation is prevented from being
performed to a maximum steering angle θmax and impact by
end contact can be mitigated.

8 Claims, 17 Drawing Sheets

(56) References Cited

U.S. PATENT DOCUMENTS

| | | | | |
|---|---|---|---|---|
| 8,541,965 | B2 * | 9/2013 | Ueda | H02P 29/032 |
| | | | | 318/400.09 |
| 9,219,439 | B2 * | 12/2015 | Sasaki | H02P 21/0089 |
| 9,473,058 | B2 * | 10/2016 | Ogi | H02P 21/22 |
| 9,731,751 | B2 * | 8/2017 | Kawamura | B62D 15/021 |
| 10,784,803 | B2 * | 9/2020 | Eguchi | H02P 27/12 |
| 10,972,033 | B2 * | 4/2021 | Miki | H02P 27/12 |
| 11,104,374 | B2 * | 8/2021 | Miki | H02P 21/06 |
| 11,312,409 | B2 * | 4/2022 | Kato | H02P 21/04 |
| 11,685,429 | B2 * | 6/2023 | Yamaguchi | B62D 15/0215 |
| | | | | 701/41 |
| 11,897,555 | B2 * | 2/2024 | Toko | B62D 5/0463 |
| 12,212,258 | B2 * | 1/2025 | Kitagawa | B62D 5/04 |
| 2007/0107973 | A1 * | 5/2007 | Jiang | B62D 5/046 |
| | | | | 180/443 |
| 2007/0284180 | A1 * | 12/2007 | Suehiro | B62D 5/0469 |
| | | | | 180/444 |
| 2009/0069980 | A1 * | 3/2009 | Sakamaki | B62D 5/0463 |
| | | | | 701/42 |
| 2009/0167224 | A1 * | 7/2009 | Miura | H02P 6/10 |
| | | | | 318/400.23 |
| 2009/0256503 | A1 * | 10/2009 | Ueda | H02P 25/024 |
| | | | | 318/400.22 |
| 2011/0025238 | A1 * | 2/2011 | Ueda | H02P 21/06 |
| | | | | 318/400.02 |
| 2013/0218403 | A1 * | 8/2013 | Abe | B62D 5/0481 |
| | | | | 701/32.8 |
| 2014/0312812 | A1 * | 10/2014 | Sasaki | H02P 21/0089 |
| | | | | 318/400.02 |
| 2015/0311835 | A1 * | 10/2015 | Hara | H02P 21/06 |
| | | | | 318/400.01 |
| 2016/0079900 | A1 * | 3/2016 | Ogi | H02P 6/10 |
| | | | | 318/400.02 |
| 2016/0272237 | A1 * | 9/2016 | Kawamura | B62D 5/0469 |
| 2018/0194389 | A1 | 7/2018 | Imamura | |
| 2019/0393817 | A1 * | 12/2019 | Eguchi | H02P 21/22 |
| 2020/0274473 | A1 * | 8/2020 | Miki | B62D 5/0463 |
| 2021/0070351 | A1 | 3/2021 | Kataoka et al. | |
| 2021/0078628 | A1 * | 3/2021 | Toko | B62D 5/0463 |
| 2021/0214000 | A1 * | 7/2021 | Miki | H02P 21/06 |
| 2021/0229737 | A1 * | 7/2021 | Yamaguchi | B62D 5/0463 |
| 2023/0412100 | A1 * | 12/2023 | Kitagawa | B62D 5/04 |
| 2024/0025472 | A1 * | 1/2024 | Mori | H02P 25/03 |
| 2024/0283381 | A1 * | 8/2024 | Hayashi | H02P 21/22 |
| 2025/0042467 | A1 * | 2/2025 | Kataoka | B62D 5/046 |

FOREIGN PATENT DOCUMENTS

| | | | | | |
|---|---|---|---|---|---|
| JP | 2003040128 | A | * | 2/2003 | B62D 5/0463 |
| JP | 2008290525 | A | | 12/2008 | |
| JP | 2011168168 | A | * | 9/2011 | |
| JP | 2013159240 | A | * | 8/2013 | |
| JP | 5962881 | B1 | | 8/2016 | |
| JP | 2016172459 | A | * | 9/2016 | B62D 5/0469 |
| JP | 2021041784 | A | | 3/2021 | |
| JP | 7618070 | B2 | * | 1/2025 | B62D 5/0463 |
| WO | 2016051884 | A1 | | 4/2016 | |
| WO | WO-2022113317 | A1 | * | 6/2022 | H02P 21/22 |
| WO | WO-2022113318 | A1 | * | 6/2022 | H02P 21/0089 |
| WO | WO-2023153050 | A1 | * | 8/2023 | B62D 5/0463 |

* cited by examiner

ELECTRIC POWER STEERING DEVICE

TECHNICAL FIELD

The present disclosure relates to an electric power steer-ing device.

BACKGROUND ART

As a power steering device mounted to a vehicle, there is known an electric power steering (EPS) device having a motor as a driving source. Normally, in a case of driving a motor by a semiconductor power converter provided to an electric power steering device, AC current is decomposed into magnetic flux component current and torque component current by a method called coordinate conversion, and control is performed so that a torque current component corresponding to an assist torque target value for the motor becomes a desired value. Thus, motor torque can be made to be desired assist torque.

In a case of using a motor having a permanent magnet in a rotor, as the rotation speed increases, induced voltage reaches a voltage amplitude that can be applied to the motor. Therefore, flux weakening control in which the magnetic flux component current is controlled so as to cancel out a magnetic flux of the rotor is performed, whereby increase in the induced voltage is suppressed and driving is performed up to a high rotation speed.

In the EPS, a movable range of a turn angle of a vehicle front wheel to which the EPS is mounted is set and thus such a steering operation that the turn angle goes beyond both ends of the movable range cannot be performed. Specifi-cally, the movable range of the turn angle is set by contact of an end (rack end) of a rack shaft with a rack housing.

Therefore, in a state in which the steering is operated to near a maximum steering angle (steering end position) to which a steering operation is possible, if a steering-turning operation of further increasing the absolute value of the steering angle is performed at a great steering angular velocity, the rack end collides with the rack housing, to cause impact on a steering system. Such impact by the end contact transfers to the steering, thus causing a problem that a steering feeling is deteriorated and a hit sound increases.

In order to cope with such a problem, it is known that, before a rack end comes into contact with a rack housing, a current command value corresponding to an assist torque target value is limited so as not to exceed a limitation value based on a steering angle, thus mitigating impact of end contact (see, for example, Patent Document 1).

CITATION LIST

Patent Document

Patent Document 1: Japanese Patent No. 5962881 (claim 5, FIG. 9, etc.)

SUMMARY OF THE INVENTION

Problem to be Solved by the Invention

In the configuration disclosed in Patent Document 1, only a torque current component is reduced, and therefore, even if the absolute value of the current command value is limited so as not to exceed the current limitation value, steering can be performed at a great steering angular velocity owing to assist torque corresponding to the current command value within the limitation range. Thus, for example, in a case of traveling on a low μ road on which a road surface reaction force μ is small, impact of end contact cannot be sufficiently mitigated, resulting in deterioration in a steering feeling. In this regard, there is a demand of achieving a favorable steering feeling by using an electric power steering device and it is desired to achieve a favorable steering feeling even in a case of traveling on a low μ road.

The present disclosure has been made to solve the above problem, and an object of the present disclosure is to provide an electric power steering device that can mitigate impact of end contact and prevent deterioration in a steering feeling, even on a low μ road.

Means to Solve the Problem

An electric power steering device according to the present disclosure includes a control device which calculates a current command value on the basis of steering torque given through an operation of a steering shaft and calculates a voltage command value on the basis of the current command value, and a power converter which supplies a motor with power converted on the basis of the voltage command value outputted from the control device, the electric power steer-ing device being configured to generate assist torque to the steering shaft by driving of the motor. The control device includes a q-axis current command value calculation unit and a d-axis current command value calculation unit which calculate the current command value, a motor control signal calculation unit which calculates the voltage command value on the basis of a q-axis current command value calculated by the q-axis current command value calculation unit and a d-axis current command value calculated by the d-axis current command value calculation unit, and a control steering angle calculation unit which calculates a steering angle of the steering shaft on the basis of a rotation position of the motor. The q-axis current command value calculation unit includes a base current command value calculation unit which calculates a base q-axis current command value as a reference, on the basis of the steering torque, a q-axis current limitation value calculation unit which calculates a q-axis current limitation value such that, in a case where an absolute value of the steering angle calculated by the control steering angle calculation unit is equal to or greater than a predetermined first steering angle threshold, the q-axis cur-rent limitation value decreases with increase in the absolute value of the steering angle and becomes a negative value toward a maximum steering angle, and a q-axis current guard processing unit which receives the base q-axis current command value calculated by the base current command value calculation unit and the q-axis current limitation value calculated by the q-axis current limitation value calculation unit. In a case where the steering angle is equal to or greater than the first steering angle threshold and the base q-axis current command value is greater than the q-axis current limitation value, the q-axis current guard processing unit sets the q-axis current command value on the basis of the q-axis current limitation value instead of the base q-axis current command value. In a case where the steering angle is equal to or smaller than −1×the first steering angle threshold and the base q-axis current command value is smaller than −1×the q-axis current limitation value, the q-axis current guard processing unit sets the q-axis current command value on the basis of −1×the q-axis current limitation value instead of the base q-axis current command value. The q-axis current guard processing unit outputs the q-axis current command value to the motor control signal calculation unit.

Effect of the Invention

The electric power steering device according to the present disclosure can mitigate impact of end contact and prevent deterioration in a steering feeling, even on a low p road.

DESCRIPTION OF EMBODIMENTS

Figure 1:
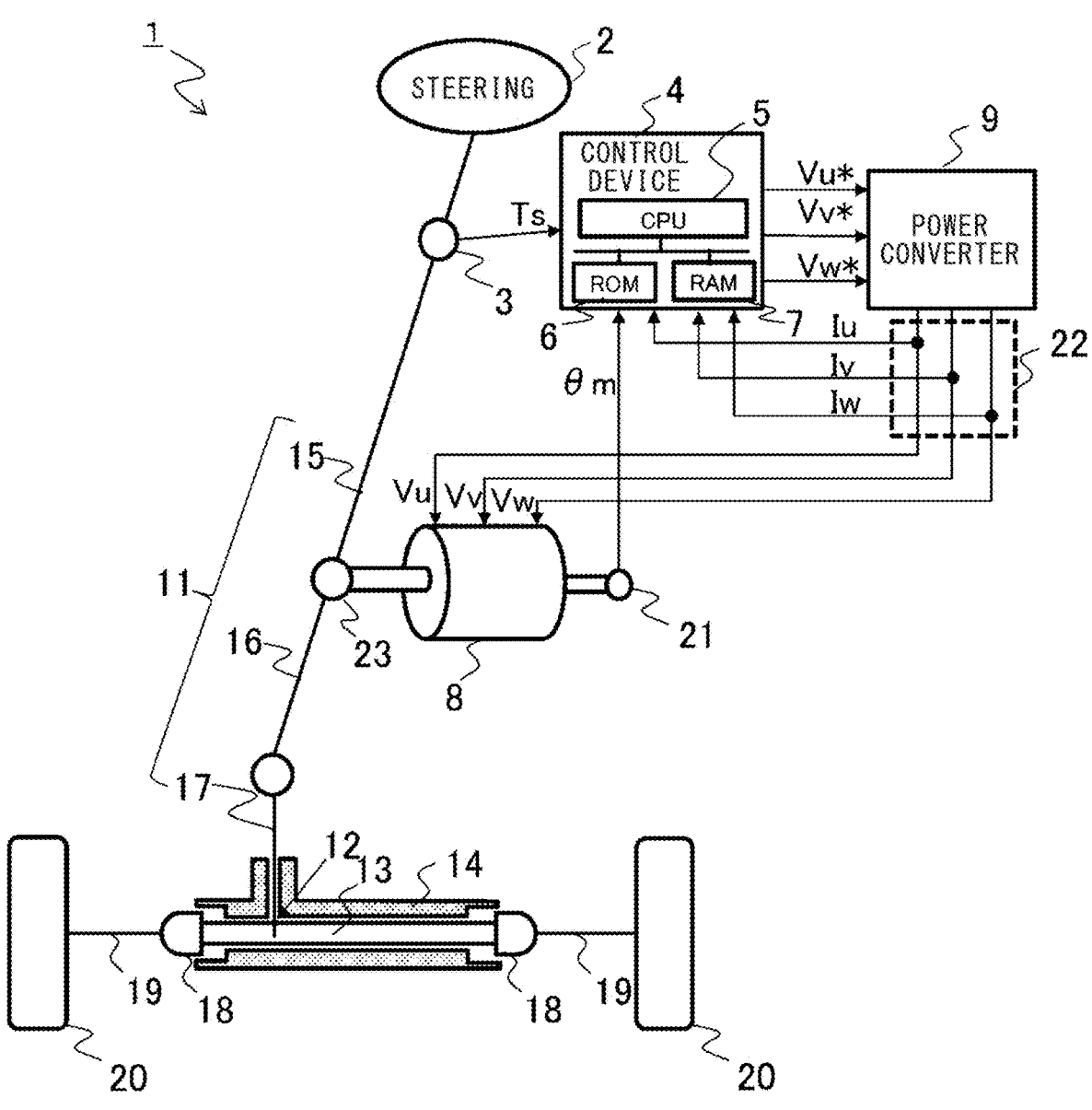
FIG. 1 shows the configuration of an electric power steering device according to embodiment 1.

Hereinafter, preferable examples of an electric power steering (EPS) device according to the present disclosure will be described. In the drawings, the same reference characters denote the same or corresponding parts.

Embodiment 1

Hereinafter, a power steering device according to embodiment 1 will be described with reference to the drawings.

FIG. 1 shows the configuration of the electric power steering device according to embodiment 1. In FIG. 1, an electric power steering device 1 includes a steering shaft 11 to which a steering 2 is attached, a rack-and-pinion mechanism 12, a rack shaft 13, and a cylindrical rack housing 14 in which the rack shaft 13 is inserted. Thus, rotation of the steering shaft 11 by operation of the steering 2 is converted into an axial-direction reciprocating motion of the rack shaft 13 via the rack-and-pinion mechanism 12. The steering shaft 11 is composed of a column shaft 15, an intermediate shaft 16, and a pinion shaft 17, in this order from the steering 2 side. At both ends of the rack shaft 13, rack ends 18 formed by ball joints, tie rods 19, knuckles (not shown), and front wheels 20 are connected in this order from the sides close to the rack shaft 13.

Positions at which the rack shaft 13 comes into contact with the rack ends 18 on both sides when performing a reciprocating motion are left and right maximum steering angles θmax (steering end positions) to which steering operation is possible.

A torque sensor 3 is provided to the steering shaft 11. When steering torque is given to the steering 2 by a driver's operation, the torque sensor 3 detects steering torque, and detected steering torque Ts is outputted to a control device 4. The control device 4 calculates three-phase voltage commands Vu*, Vv*, Vw* to be applied to a motor 8, on the basis of the steering torque Ts detected by the torque sensor 3, and outputs the three-phase voltage commands Vu*, Vv*, Vw* to a power converter 9. Where the steering torque Ts when a steering operation is performed in one direction is defined as a positive value, the steering torque Ts is detected as a negative value when a steering operation is performed in the opposite direction.

The control device 4 is composed of a central processing unit (CPU) 5 or a processor and a storage device, as an example of hardware. The storage device is provided with a volatile storage device such as a random access memory (RAM) 7 and a read only memory (ROM) 6 which is a nonvolatile auxiliary storage device such as a flash memory. Instead of the flash memory, an auxiliary storage device of a hard disk may be provided. The CPU 5 sequentially executes a program inputted from the ROM 6. In this case, the program is inputted from the ROM 6 to the CPU 5 via the RAM 7. The CPU 5 may output data such as a calculation result to the RAM 7, or may store such data into the ROM 6 via the RAM 7. By the program, functions (see FIG. 2) of the control device 4 described later are executed.

The power converter 9 has, for example, switching elements and the like formed by semiconductor devices, and applies, to the motor 8, three-phase voltages Vu, Vv, Vw which are voltages converted to predetermined values on the basis of the three-phase voltage commands Vu*, Vv*, Vw* outputted from the control device 4. A current detection unit 22 detects three-phase currents supplied from the power converter 9 to the motor 8, and outputs the three-phase currents to the control device 4. The current detection unit 22 in the present embodiment detects three-phase currents Iu, Iv, Iw. However, the current detection unit 22 may detect currents Iu, Iv for two phases among the three-phase currents.

The motor 8 generates assist torque for assisting steering torque on the steering shaft 11 via the gear 23, and the steering torque and the assist torque are transferred to the rack shaft 13, whereby the turn angles of the front wheels 20 on the advancing direction side of the vehicle are changed.

The motor is provided with a rotation position detection unit 21, and the rotation position detection unit 21 detects a rotation position θm (electrical angle) of the motor 8 as a relative angle in a range of 360°, and outputs the rotation position θm to the control device 4.

The rotation position detection unit 21 in the present embodiment 1 is shown as a type that directly detects the rotation position, e.g., a resolver. However, the rotation position may be obtained by a known method through calculation on the basis of voltage applied to the motor 8 and current detected by the current detection unit 22. Where the rotation position θm when a steering operation is performed in one direction is defined as a positive value, the rotation position Gm is detected as a negative value when a steering operation is performed in the opposite direction.

Next, functions of the control device 4 will be described.

Figure 2:
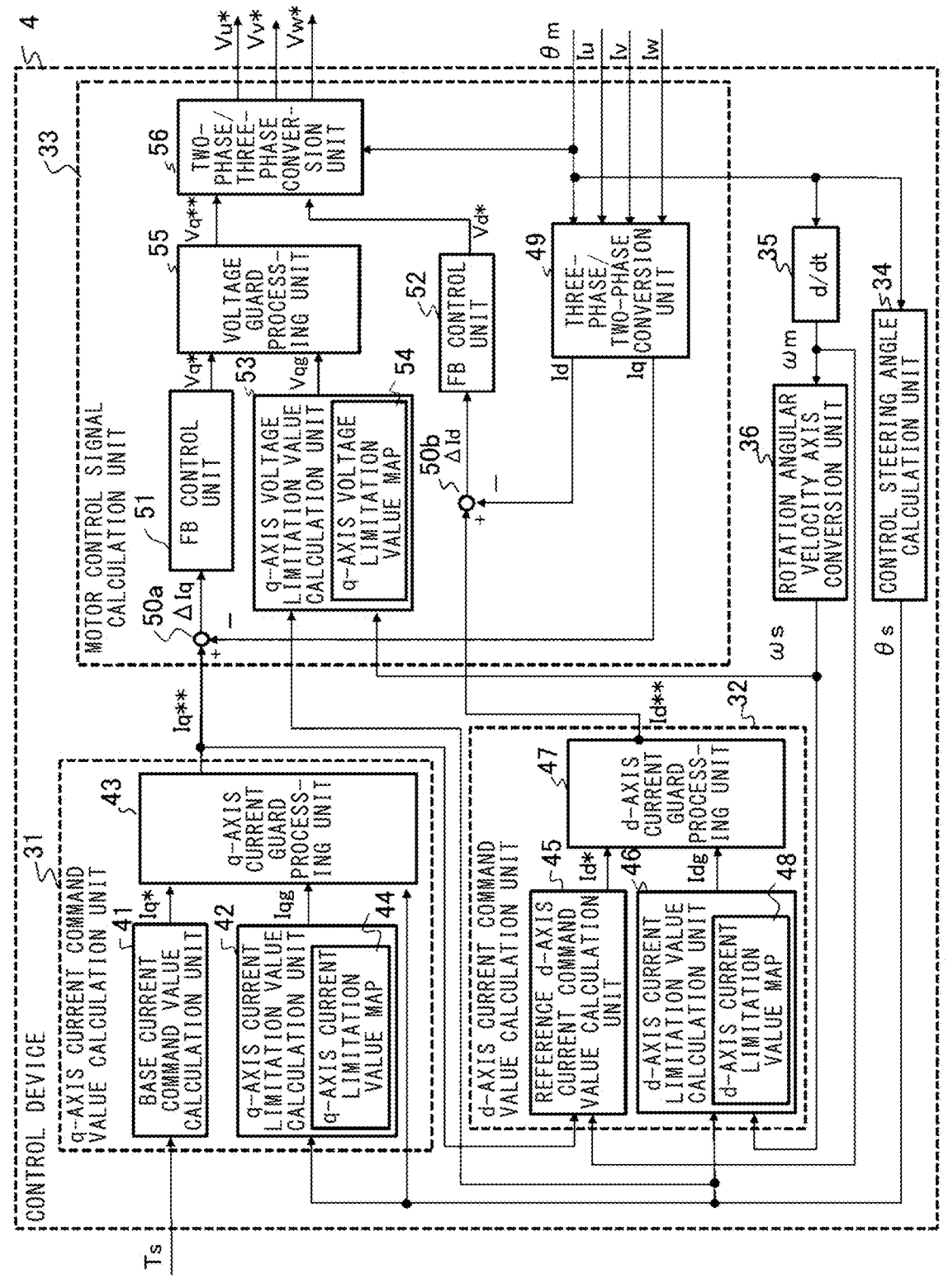
FIG. 2 is a block diagram showing the configuration of a control device of the electric power steering device according to embodiment 1.

FIG. 2 is a function block diagram showing the configuration of the control device 4. In FIG. 2, the control device 4 includes a q-axis current command value calculation unit 31 which calculates a q-axis current command value Iq corresponding to an assist torque target value, a d-axis current command value calculation unit 32 which calculates a d-axis current command value Id corresponding to a magnetic flux component current target value, and a motor control signal calculation unit 33 which outputs the three-phase voltage commands Vu*, Vv*, Vw* on the basis of the q-axis current command value Iq and the d-axis current command value Id.

The q-axis current command value Iq and the d-axis current command value Id are target values of currents to be supplied to the motor 8 and are a current command value on a d axis and a current command value on a q axis in a d-q coordinate system, respectively. Where the q-axis current command value Iq when a steering operation is assisted in one direction is defined as a positive value, the q-axis current command value Iq becomes a negative value when a steering operation is assisted in the other direction. The d-axis current command value Id** is always a value equal to or smaller than 0, irrespective of the steering assisting direction.

Further, the control device 4 includes a control steering angle calculation unit 34, a differentiator 35 described later, and a rotation angular velocity axis conversion unit 36 described later. The control steering angle calculation unit 34 calculates a control steering angle θs which can be converted to the turn angle of the front wheel 20 and corresponds to the rotation angle of the steering shaft 11. The control steering angle calculation unit 34 receives the rotation position θm of the motor 8 detected by the rotation position detection unit 21.

Here, operation in the control steering angle calculation unit 34 will be described using a specific example. For example, one revolution is defined as 360° from, as an origin, a reference control steering angle θs0 in a state in which the vehicle is traveling straight, and the number of revolutions of the motor 8 is counted. Then, on the basis of the number of revolutions of the motor 8 and the rotation position θm of the motor 8, the control steering angle θs is calculated as an absolute steering angle in a range greater than 360°. The control steering angle θs when being a rotation angle in one direction from the origin is defined as a positive value, and the control steering angle θs when being a rotation angle in the other direction is defined as a negative value.

In a state in which the steering 2 is operated to near the maximum steering angle θmax (steering end position), i.e., a state in which the turn angle of the front wheel 20 is near the limit of the movable range, if a steering-turning operation of further increasing the absolute value of the control steering angle θs is performed at a great steering angular velocity ωs, the rack end 18 collides with the rack housing 14, thus causing impact on the steering system. In order to cope with such a problem, for example, it is conceivable that the q-axis current command value Iq** corresponding to the assist torque target value is limited so as not to exceed a limitation value based on the steering angle, thus reducing the absolute value of the assist torque target value. However, as previously described, in a case of traveling on a low μ road on which a road surface reaction force μ is small, impact of end contact cannot be sufficiently mitigated.

Accordingly, in the present embodiment, the q-axis current command value calculation unit 31, the d-axis current command value calculation unit 32, and the motor control signal calculation unit 33 of the control device 4 respectively calculate the q-axis current command value Iq, the d-axis current command value Id, and a q-axis voltage command value Vq** in accordance with the steering angle, thus making it possible to sufficiently mitigate impact of end contact.

First, the q-axis current command value calculation unit 31 will be described.

The q-axis current command value calculation unit 31 includes a base current command value calculation unit 41 which calculates a base q-axis current command value Iq* as a reference for the q-axis current command value Iq, a q-axis current limitation value calculation unit 42 which calculates a q-axis current limitation value Iqg, and a q-axis current guard processing unit 43 which calculates the q-axis current command value Iq.

The base current command value calculation unit 41 receives the steering torque Ts detected by the torque sensor 3. The base current command value calculation unit 41 calculates the base q-axis current command value Iq* on the basis of the steering torque Ts. As a matter of course, the base current command value calculation unit 41 may calculate the base q-axis current command value Iq* on the basis of information other than the steering torque Ts, such as a vehicle velocity (not shown), in addition to the steering torque Ts. Specifically, the base current command value calculation unit 41 has a map defining the relationship between the steering torque Ts and the base q-axis current command value Iq*, and calculates the base q-axis current command value Iq* according to the steering torque Ts by referring to the map. This map is set such that, as the absolute value of the steering torque Ts becomes greater, the base q-axis current command value Iq* has a greater absolute value. The base q-axis current command value Iq* calculated by the base current command value calculation unit 41 as described above is outputted to the q-axis current guard processing unit 43.

The q-axis current limitation value calculation unit 42 receives the control steering angle θs calculated by the control steering angle calculation unit 34. The q-axis current limitation value calculation unit 42 has a q-axis current limitation value map 44 indicating the relationship between an absolute value |θs| of the control steering angle θs and the q-axis current limitation value Iqg, and calculates the q-axis current limitation value Iqg on the basis of the q-axis current limitation value map 44.

Figure 3:
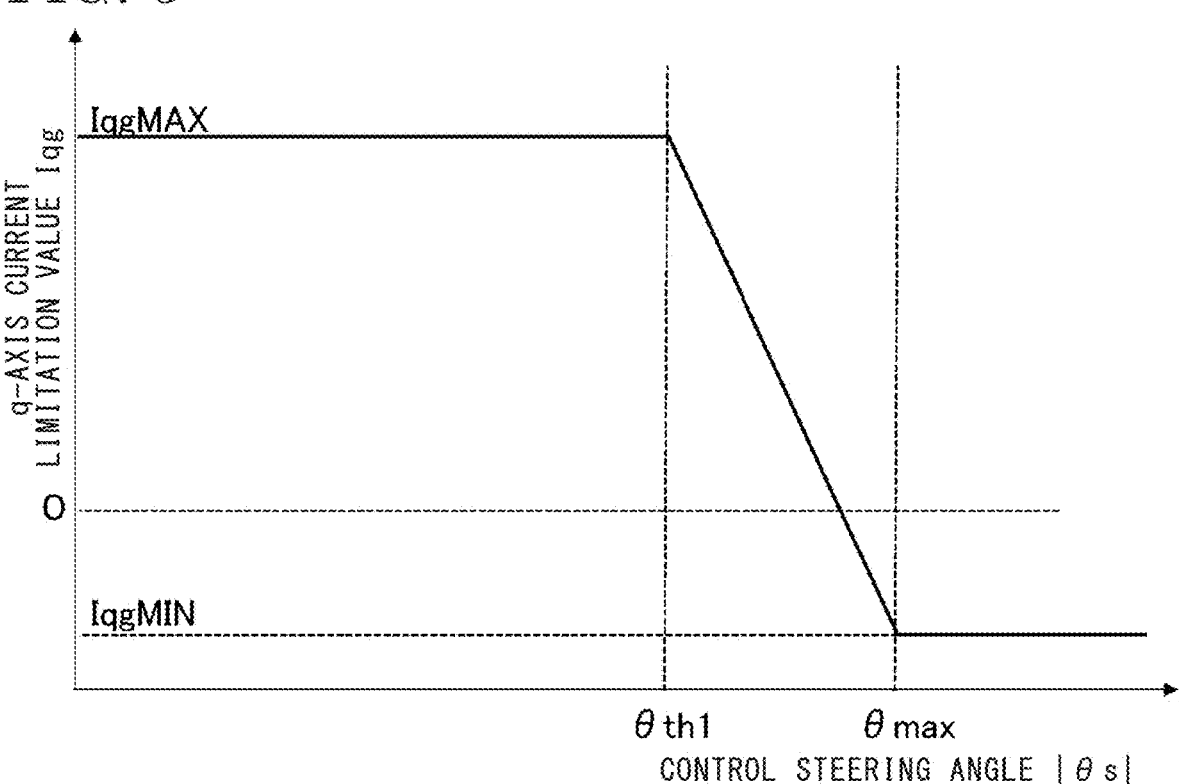
FIG. 3 shows an example of a q-axis current limitation value map provided in a q-axis current limitation value calculation unit according to embodiment 1.

FIG. 3 shows an example of the q-axis current limitation value map 44. As shown in FIG. 3, calculation is performed such that, in a case where the absolute value |θs| of the control steering angle θs is greater than a first steering angle threshold θth1 near the maximum steering angle θmax, the q-axis current limitation value Iqg becomes smaller as the absolute value |θs| of the control steering angle θs becomes greater, and calculation is performed such that, between the first steering angle threshold θth1 and the maximum steering angle θmax, the q-axis current limitation value Iqg decreases to a negative value, reaching a q-axis current limitation value minimum value IqgMIN. The calculated q-axis current limitation value Iqg is outputted to the q-axis current guard processing unit 43. The minimum value of the q-axis current limitation value map 44 is set at the q-axis current limitation value minimum value IqgMIN, and the absolute value of the q-axis current limitation value minimum value IqgMIN is such a value that the motor 8 can output greater torque than driver torque that a general driver can output.

In the present embodiment, the first steering angle threshold θth1 is set at such a value that, when the steering 2 is being operated at the maximum steering angular velocity ωs at which a general driver can perform a steering operation, the steering angular velocity ωs can be decreased to 0 or less in a range from the first steering angle threshold θth1 to the maximum steering angle θmax so that the control steering angle θs will not reach the maximum steering angle θmax.

In a case where the control steering angle θs is equal to or smaller than the first steering angle threshold θth1, the q-axis current limitation value Iqg is calculated to be a value IqgMAX greater than the absolute value of the maximum q-axis current value that the motor 8 can output, and the calculated q-axis current limitation value Iqg is outputted to the q-axis current guard processing unit 43.

Figure 4A:
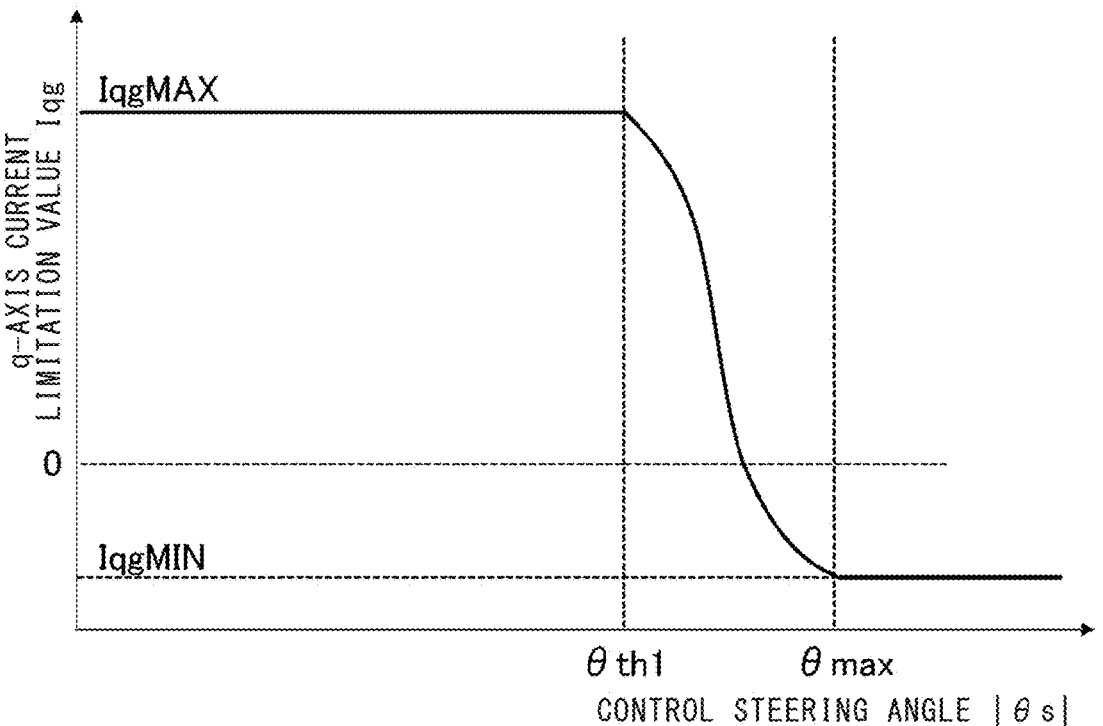
FIG. 4A shows another example of a q-axis current limitation value map provided in the q-axis current limitation value calculation unit according to embodiment 1.
Figure 4B:
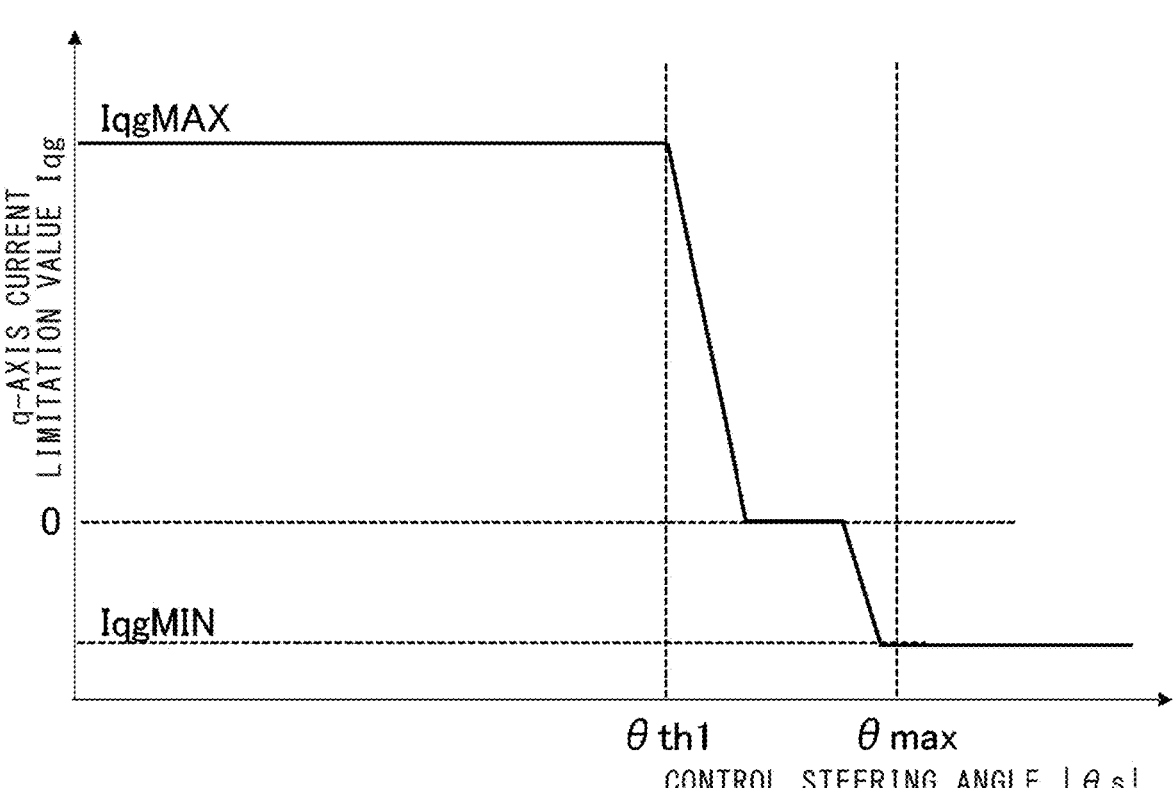
FIG. 4B shows still another example of a q-axis current limitation value map provided in the q-axis current limitation value calculation unit according to embodiment 1.

The q-axis current limitation value map 44 is not limited to the example shown in FIG. 3. FIG. 4A shows another example of the q-axis current limitation value map 44, and FIG. 4B shows still another example of the q-axis current limitation value map 44. As shown in FIG. 4A, setting may be made such that, as the absolute value of the control steering angle θs becomes greater, the q-axis current limitation value Iqg nonlinearly decreases from IqgMAX to IqgMIN. As shown in FIG. 4B, setting may be made such that, as the absolute value of the control steering angle θs becomes greater, the q-axis current limitation value Iqg decreases stepwise in multiple stages from IqgMAX to IqgMIN. In a case where the control steering angle θs is equal to or greater than the first steering angle threshold θth1, the q-axis current limitation value Iqg may be changed in one step from IqgMAX to IqgMIN, but gradually decreasing the q-axis current limitation value Iqg as the control steering angle θs becomes greater as shown in FIG. 3 can more reduce impact in a steering operation.

The q-axis current guard processing unit 43 receives the control steering angle θs in addition to the base q-axis current command value Iq* and the q-axis current limitation value Iqg, and using these values, the q-axis current guard processing unit 43 outputs the q-axis current command value Iq as described below to the d-axis current command value calculation unit 32 and the motor control signal calculation unit 33**.

(1) In a case where the received control steering angle θs is equal to or greater than the first steering angle threshold θth1 and the base q-axis current command value Iq* is greater than the q-axis current limitation value Iqg, the base q-axis current command value Iq* limited to the q-axis current limitation value Iqg is outputted as the q-axis current command value Iq to the d-axis current command value calculation unit 32 and the motor control signal calculation unit 33**.

(2) In a case where the received control steering angle θs is equal to or greater than the first steering angle threshold θth1 and the base q-axis current command value Iq* is equal to or smaller than the q-axis current limitation value Iqg, the base q-axis current command value Iq* is directly outputted as the q-axis current command value Iq to the d-axis current command value calculation unit 32 and the motor control signal calculation unit 33**.

(3) In a case where the received control steering angle θs is equal to or smaller than −1×the first steering angle threshold θth1 and the base q-axis current command value Iq* is smaller than −1×the q-axis current limitation value Iqg (i.e., the absolute value of the base q-axis current command value Iq* is greater than the q-axis current limitation value Iqg), the base q-axis current command value Iq* limited to −1×the q-axis current limitation value Iqg is outputted as the q-axis current command value Iq to the d-axis current command value calculation unit 32 and the motor control signal calculation unit 33**.

(4) In a case where the received control steering angle θs is equal to or smaller than −1×the first steering angle threshold θth1 and the base q-axis current command value Iq* is equal to or greater than −1×the q-axis current limitation value Iqg (i.e., the absolute value of the base q-axis current command value Iq* is equal to or smaller than the q-axis current limitation value Iqg), the base q-axis current command value Iq* is directly outputted as the q-axis current command value Iq to the d-axis current command value calculation unit 32 and the motor control signal calculation unit 33**.

(5) In a case where the received control steering angle θs is smaller than the first steering angle threshold θth1 and greater than −1×the first steering angle threshold θth1, the base q-axis current command value Iq* is directly outputted as the q-axis current command value Iq to the d-axis current command value calculation unit 32 and the motor control signal calculation unit 33**.

With the above calculation, in a case where a steering operation is performed so that the absolute value of the control steering angle θs becomes equal to or greater than the first steering angle threshold θth1 and comes close to the maximum steering angle θmax, the upper limit value of the absolute value of the q-axis current command value Iq corresponding to the assist torque target value is reduced, and in a case of further coming closer to the maximum steering angle θmax, the sign of the q-axis current command value Iq is reversed so that the q-axis current command value Iq is outputted in a direction opposite to the output direction of the steering torque Ts, thus preventing a steering operation from being performed to the maximum steering angle θmax (steering end position) and mitigating impact of end contact. That is, the "guard processing" in the q-axis current guard processing unit 43 is to calculate the q-axis current command value Iq so as to mitigate impact of end contact.

Figure 5:
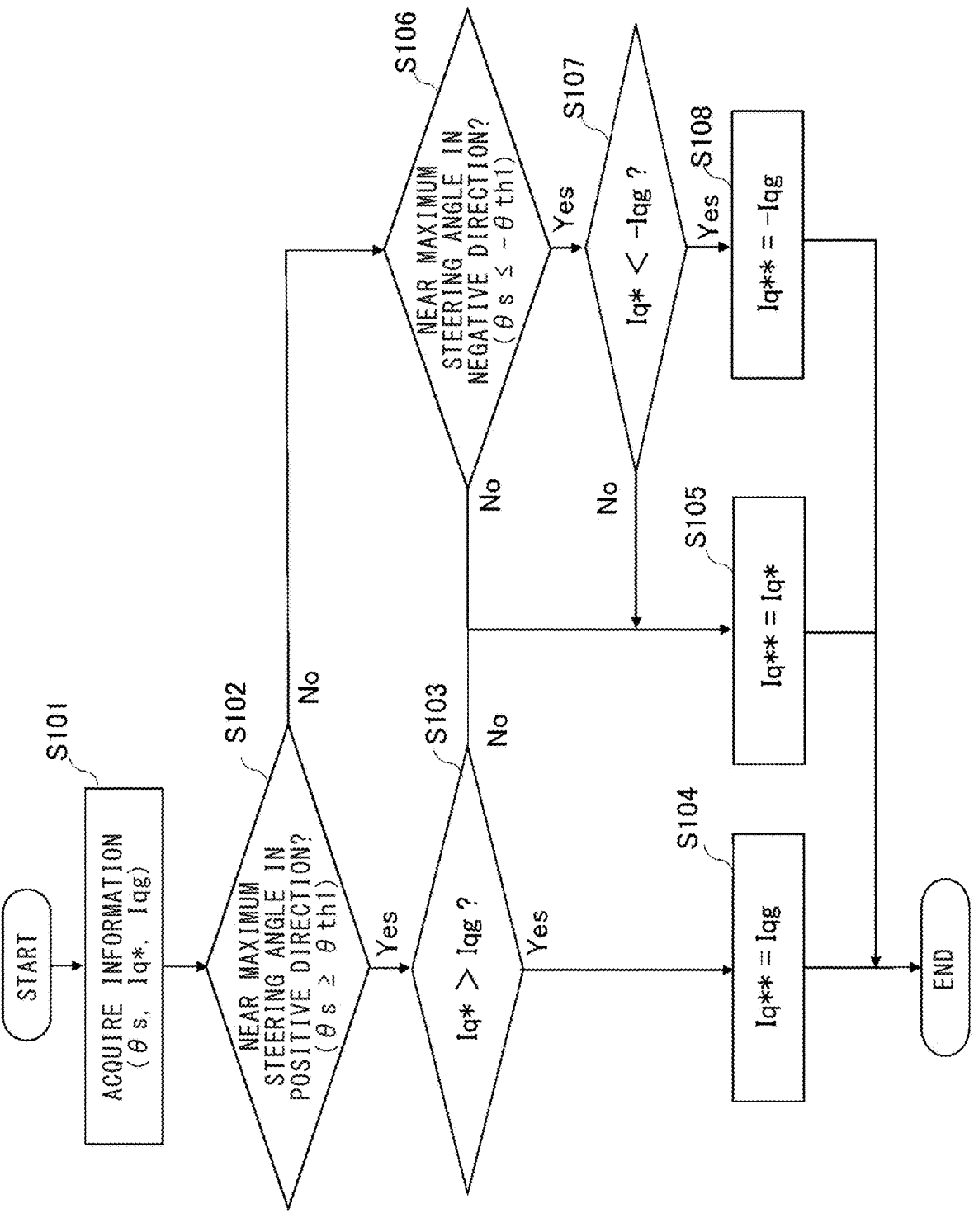
FIG. 5 is a flowchart showing operation in a q-axis current guard processing unit according to embodiment 1.

Next, such operation of the q-axis current guard processing unit 43 described above will be described with reference to a flowchart shown in FIG. 5.

First, in step S101, the q-axis current guard processing unit 43 acquires the control steering angle $\theta$s, the base q-axis current command value Iq*, and the q-axis current limitation value Iqg, as input information.

Next, in step S102, whether or not the control steering angle $\theta$s is near the maximum steering angle $\theta$max in the positive direction is determined on the basis of whether or not the control steering angle $\theta$s is equal to or greater than the first steering angle threshold $\theta$th1. If the control steering angle $\theta$s is equal to or greater than the first steering angle threshold $\theta$th1, it is determined that the control steering angle $\theta$s is near the maximum steering angle $\theta$max in the positive direction (Yes in step S102), thus proceeding to step S103.

In step S103, whether or not the base q-axis current command value Iq* is greater than the q-axis current limitation value Iqg is determined. If the base q-axis current command value Iq* is greater than the q-axis current limitation value Iqg (Yes in step S103), the process proceeds to step S104, to output the q-axis current limitation value Iqg as the q-axis current command value Iq**.

In step S103, if the base q-axis current command value Iq* is equal to or smaller than the q-axis current limitation value Iqg (No in step S103), the process proceeds to step S105, to output the base q-axis current command value Iq* as the q-axis current command value Iq**.

In step S102, if the control steering angle $\theta$s is not near the maximum steering angle $\theta$max in the positive direction, i.e., the control steering angle $\theta$s is smaller than the first steering angle threshold $\theta$th1 (No in step S102), the process proceeds to step S106. In step S106, whether or not the control steering angle $\theta$s is near the maximum steering angle $\theta$max in the negative direction is determined on the basis of whether or not the control steering angle $\theta$s is equal to or smaller than $-1\times$the first steering angle threshold $\theta$th1.

In step S106, if the control steering angle $\theta$s is equal to or smaller than $-1\times$the first steering angle threshold $\theta$th1, it is determined that the control steering angle $\theta$s is near the maximum steering angle $\theta$max in the negative direction (Yes in step S106), thus proceeding to step S107. In step S107, whether or not the base q-axis current command value Iq* is smaller than $-1\times$the q-axis current limitation value Iqg is determined.

In step S107, if the base q-axis current command value Iq* is smaller than $-1\times$the q-axis current limitation value Iqg (Yes in step S107), the process proceeds to step S108, to output $-1\times$the q-axis current limitation value Iqg as the q-axis current command value Iq**.

In step S107, if the base q-axis current command value Iq* is equal to or greater than $-1\times$the q-axis current limitation value Iqg (No in step S107), the process proceeds to step S105, to output the base q-axis current command value Iq* as the q-axis current command value Iq**.

In step S106, if the control steering angle $\theta$s is greater than $-1\times$the first steering angle threshold $\theta$th1 (No in step S106), the process proceeds to step S105, to output the base q-axis current command value Iq* as the q-axis current command value Iq**.

As described above, by the q-axis current limitation value calculation unit 42 and the q-axis current guard processing unit 43, limitation is performed such that, in a case where the control steering angle $\theta$s is equal to or greater than the first steering angle threshold $\theta$th1, the q-axis current limitation value Iqg which is the upper limit value of the base q-axis current command value Iq* is reduced, and if the control steering angle $\theta$s further comes closer to the maximum steering angle $\theta$max in the positive direction, the sign of the q-axis current limitation value Iqg becomes negative. On the other hand, limitation is performed such that, in a case where the control steering angle $\theta$s is equal to or smaller than $-1\times$the first steering angle threshold $\theta$th1, $-1\times$the q-axis current limitation value Iqg which is the lower limit value of the base q-axis current command value Iq* is increased, and if the control steering angle $\theta$s further comes closer to the maximum steering angle $-1\times\theta$max in the negative direction, the sign of $-1\times$the q-axis current limitation value Iqg becomes positive. Through the above control, a steering operation is prevented from being performed to the maximum steering angle $\theta$max and impact by end contact can be mitigated.

Next, the d-axis current command value calculation unit 32 will be described. In FIG. 2, the d-axis current command value calculation unit 32 includes a reference d-axis current command value calculation unit 45 which calculates a d-axis current command value before guard processing, a d-axis current limitation value calculation unit 46, and a d-axis current guard processing unit 47.

The rotation position $\theta$m of the motor 8 detected by the rotation position detection unit 21 is inputted to the differentiator 35 in which a change rate of the rotation position $\theta$m is calculated, and the change rate is outputted as a rotation speed $\omega$m of the motor 8. The reference d-axis current command value calculation unit 45 which calculates the d-axis current command value before guard processing, receives the rotation speed $\omega$m and the q-axis current command value Iq outputted from the q-axis current guard processing unit 43. As described above, if the absolute value of the rotation speed $\omega$m increases, induced voltage reaches a voltage amplitude that can be applied to the motor 8. Therefore, the reference d-axis current command value calculation unit 45** outputs a reference d-axis current command value Id* calculated to be such a value as to cancel out a magnetic flux of the rotor so that driving can be performed up to a high rotation speed, to the d-axis current guard processing unit 47. When d-axis current is negative, a magnetic flux that cancels out a magnetic flux of the rotor is generated by a stator of the motor through which the d-axis current flows.

The rotation speed $\omega$m outputted from the differentiator 35 is converted to a rotation speed of a steering shaft by the rotation angular velocity axis conversion unit 36, and the converted rotation speed is outputted as the steering angular velocity $\omega$s. The d-axis current limitation value calculation unit 46 receives the control steering angle $\theta$s and the steering angular velocity $\omega$s. Then, the d-axis current limitation value calculation unit 46 has a d-axis current limitation value map 48 indicating the relationship between the absolute value $|\theta$s$|$ of the control steering angle $\theta$s and a d-axis current limitation value Idg, and calculates the d-axis current limitation value Idg on the basis of the d-axis current limitation value map 48.

Figure 6:
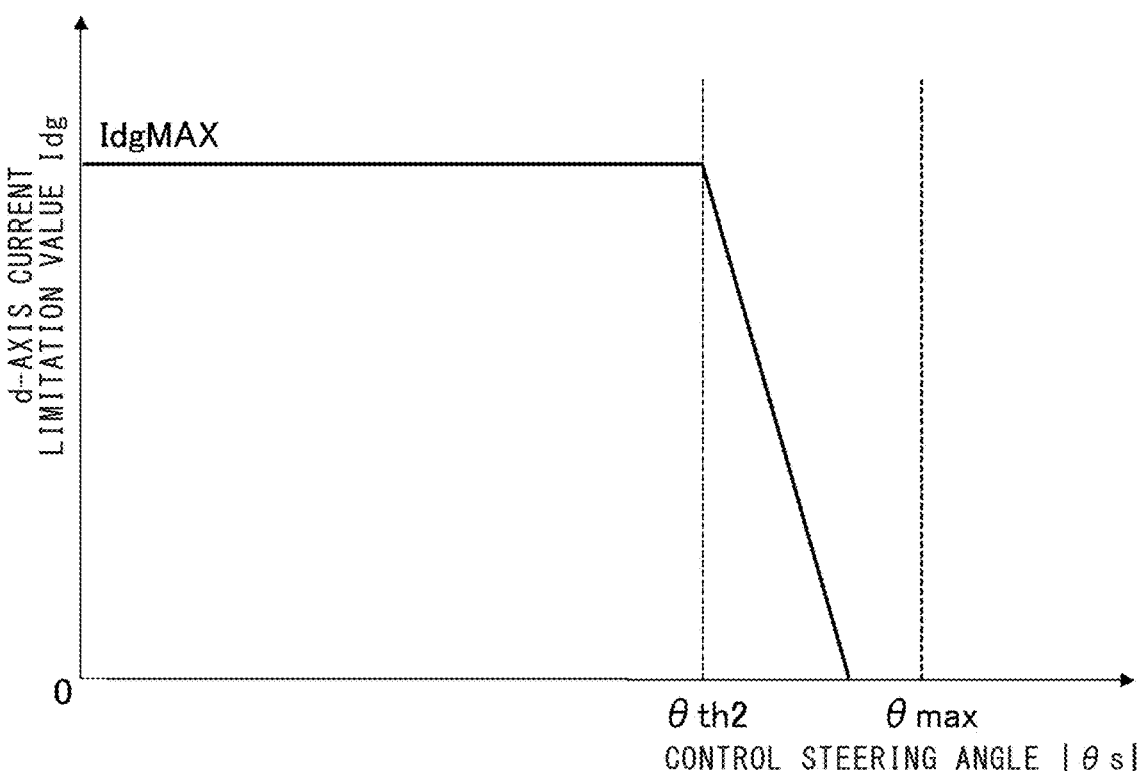
FIG. 6 shows an example of a d-axis current limitation value map provided in a d-axis current limitation value calculation unit according to embodiment 1.

FIG. 6 shows an example of the d-axis current limitation value map 48. As shown in FIG. 6, calculation is performed such that, in a case where the absolute value $|\theta$s$|$ of the control steering angle $\theta$s is greater than a second steering angle threshold $\theta$th2 near the maximum steering angle $\theta$max, and the steering state of the steering 2 is a turning state in which the steering angular velocity $\omega$s$>0$ is satisfied while the control steering angle $\theta$s is greater than 0, or a turning state in which the steering angular velocity $\omega$s$<0$ is satisfied while the control steering angle $\theta$s is smaller than 0, the d-axis current limitation value Idg becomes smaller as the absolute value |θs| of the control steering angle θs becomes greater. A calculation result of the d-axis current limitation value calculation unit 46 is outputted to the d-axis current guard processing unit 47. At this time, the minimum value of the d-axis current limitation value map 48 is set at 0.

In a case where the control steering angle θs is equal to or smaller than the second steering angle threshold θth2 or the steering state of the steering 2 is not a turning state, the d-axis current limitation value Idg calculated by the d-axis current limitation value calculation unit 46 becomes a value IdgMAX greater than the absolute value of the maximum d-axis current value Id that the motor 8 can output, and the calculated d-axis current limitation value Idg is outputted to the d-axis current guard processing unit 47.

Figure 7A:
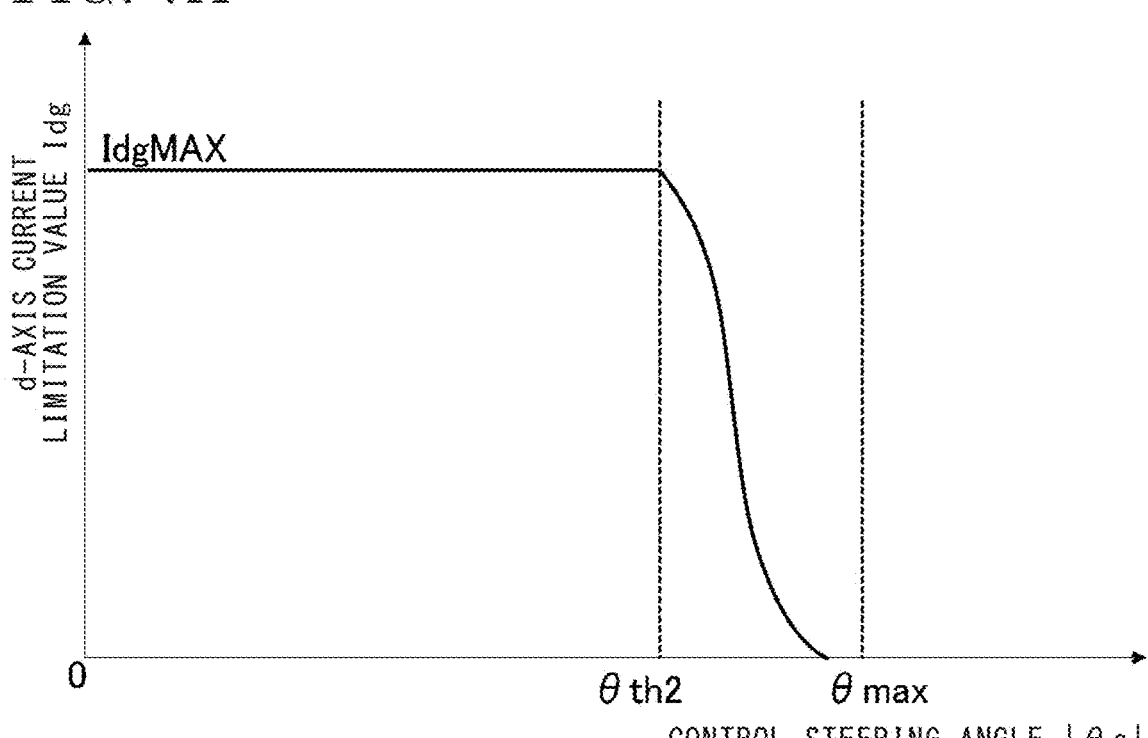
FIG. 7A shows another example of a d-axis current limitation value map provided in the d-axis current limitation value calculation unit according to embodiment 1.
Figure 7B:
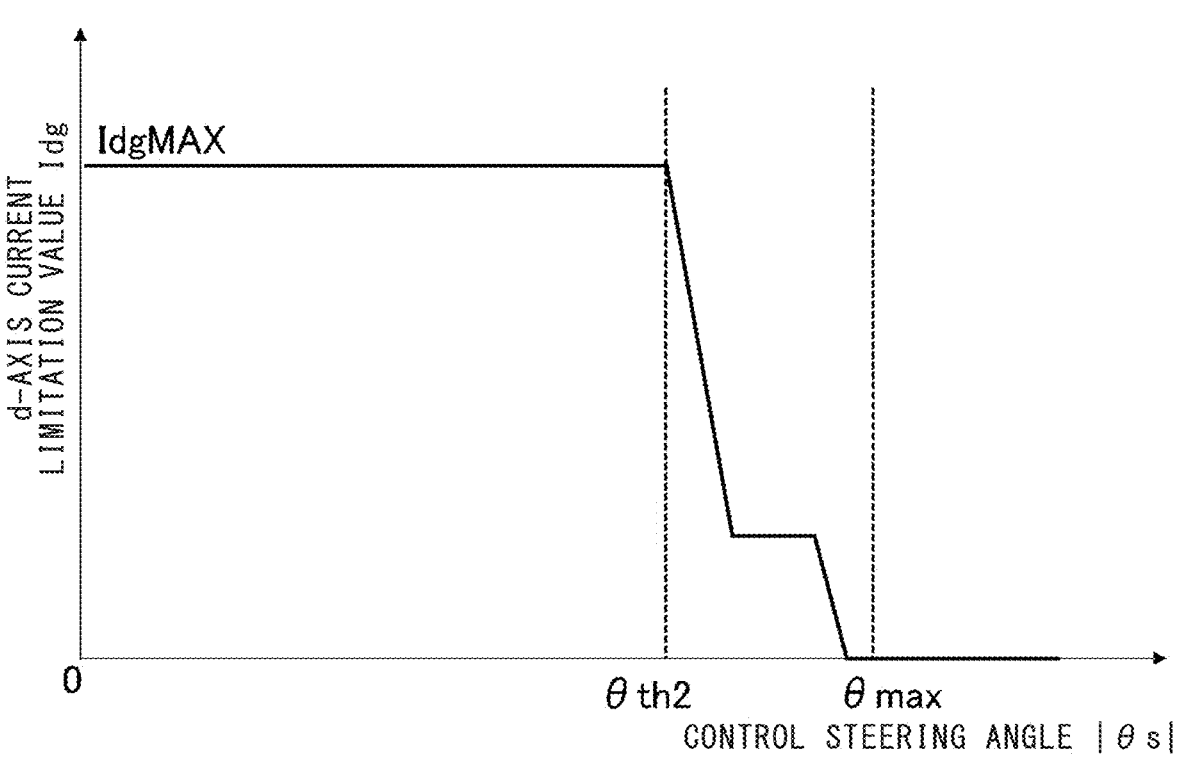
FIG. 7B shows still another example of a d-axis current limitation value map provided in the d-axis current limitation value calculation unit according to embodiment 1.

The d-axis current limitation value map 48 is not limited to the example shown in FIG. 6. FIG. 7A shows another example of the d-axis current limitation value map 48, and FIG. 7B shows still another example of the d-axis current limitation value map 48. As shown in FIG. 7A, setting may be made such that, as the absolute value of the control steering angle θs becomes greater, the d-axis current limitation value Idg nonlinearly decreases from IdgMAX to 0. As shown in FIG. 7B, setting may be made such that, as the absolute value of the control steering angle θs becomes greater, the d-axis current limitation value Idg decreases stepwise in multiple stages from IdgMAX to 0. In a case where the control steering angle θs is equal to or greater than the second steering angle threshold θth2, the d-axis current limitation value Idg may be changed in one step from IdgMAX to 0, but gradually decreasing the d-axis current limitation value Idg as the control steering angle θs becomes greater as shown in FIG. 6 can more reduce impact in steering operation.

The second steering angle threshold θth2 is set at an angle smaller than the first steering angle threshold θth1. That is, from a state in which the absolute value of the control steering angle θs is smaller than the first steering angle threshold θth1, the d-axis current limitation value calculation unit 46 in the present embodiment calculates the d-axis current limitation value Idg so that the absolute value thereof becomes smaller than the maximum d-axis current value IdgMAX that the motor 8 can output.

Figure 8:
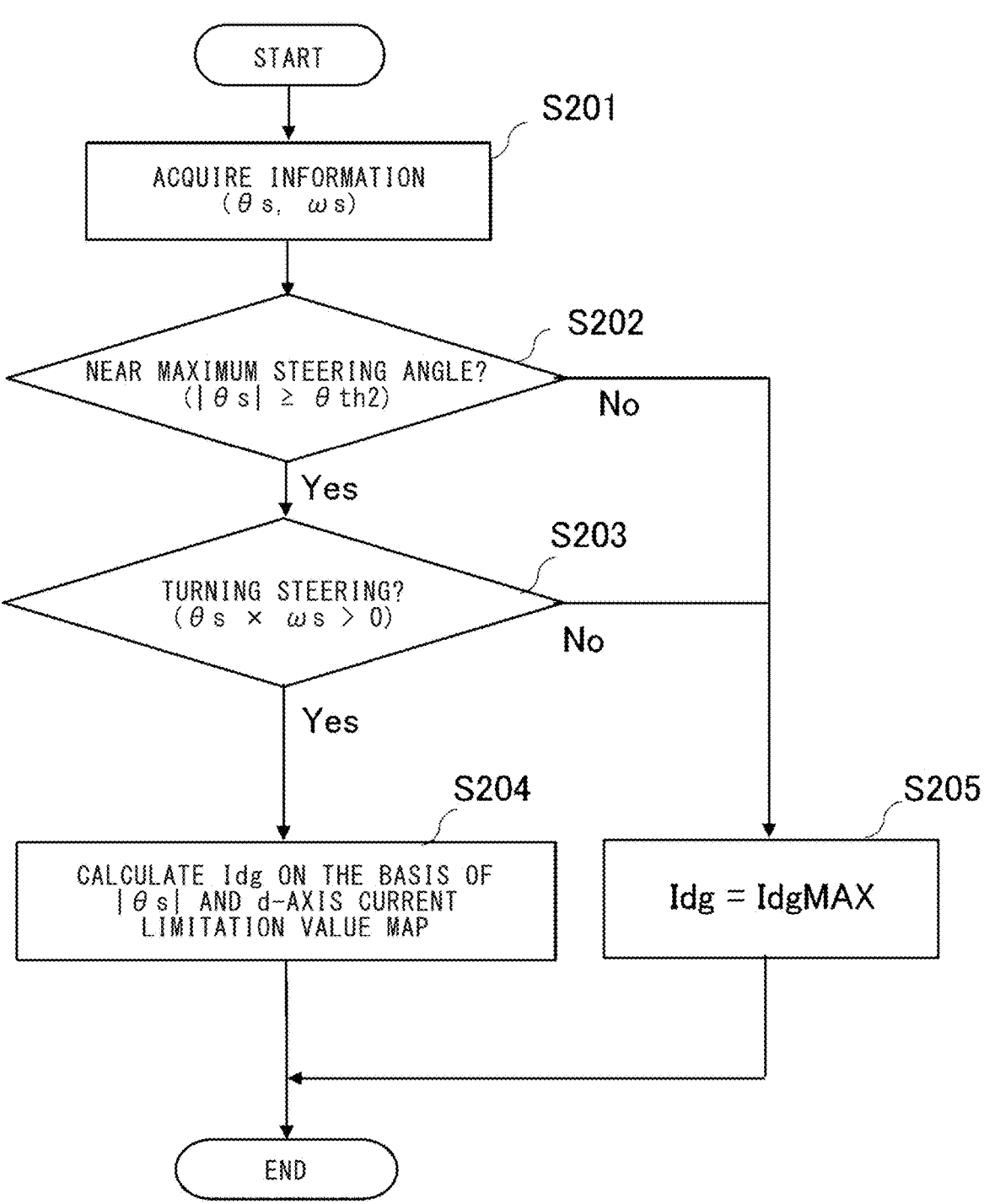
FIG. 8 is a flowchart showing operation in the d-axis current limitation value calculation unit according to embodiment 1.

Next, operation of the d-axis current limitation value calculation unit 46 will be described with reference to a flowchart shown in FIG. 8.

First, in step S201, the d-axis current limitation value calculation unit 46 acquires the control steering angle θs and the steering angular velocity ωs, as input information.

In step S202, whether or not the control steering angle θs is near the maximum steering angle θmax is determined on the basis of whether or not the control steering angle θs is equal to or greater than the second steering angle threshold θth2. If the control steering angle θs is equal to or greater than the second steering angle threshold θth2, it is determined that the control steering angle θs is near the maximum steering angle θmax (Yes in step S202), thus proceeding to step S203.

In step S203, whether or not a steering-turning operation is being performed is determined on the basis of whether or not the control steering angle θs×the steering angular velocity ωs is greater than 0. If the control steering angle θs×the steering angular velocity ωs is greater than 0, it is determined that a steering-turning operation is being performed (Yes in step S203), thus proceeding to step S204, in which a value calculated on the basis of the absolute value |θs| of the control steering angle θs and the d-axis current limitation value map 48 is outputted as the d-axis current limitation value Idg.

In step S203, if the control steering angle θs×the steering angular velocity ωs is equal to or smaller than 0, it is determined that a steering-turning operation is not being performed (No in step S203), thus proceeding to step S205, in which the maximum d-axis current value IdgMAX that the motor 8 can output is outputted as the d-axis current limitation value Idg.

In step S202, if the control steering angle θs is smaller than the second steering angle threshold θth2 and the control steering angle θs is not near the maximum steering angle θmax (No in step S202), the process proceeds to step S205, in which the maximum d-axis current value IdgMAX that the motor 8 can output is outputted as the d-axis current limitation value Idg.

The d-axis current guard processing unit 47 receives the d-axis current limitation value Idg in addition to the reference d-axis current command value Id* before guard processing, and using these values, the d-axis current guard processing unit 47 outputs the d-axis current command value Id as described below to the motor control signal calculation unit 33**.

(1) In a case where the absolute value of the received reference d-axis current command value Id* is equal to or greater than the d-axis current limitation value Idg and the reference d-axis current command value Id* is equal to or greater than 0, the d-axis current limitation value Idg is outputted as the d-axis current command value Id to the motor control signal calculation unit 33**.

(2) In a case where the absolute value of the received reference d-axis current command value Id* is equal to or greater than the d-axis current limitation value Idg and the reference d-axis current command value Id* is smaller than 0, −1×the d-axis current limitation value Idg is outputted as the d-axis current command value Id to the motor control signal calculation unit 33**.

(3) In a case where the absolute value of the received reference d-axis current command value Id* is smaller than the d-axis current limitation value Idg, the reference d-axis current command value Id* is directly outputted as the d-axis current command value Id to the motor control signal calculation unit 33**.

That is, according to the above (1) to (3), the absolute value of the d-axis current command value Id outputted from the d-axis current guard processing unit 47** does not exceed the d-axis current limitation value Idg.

Figure 9:
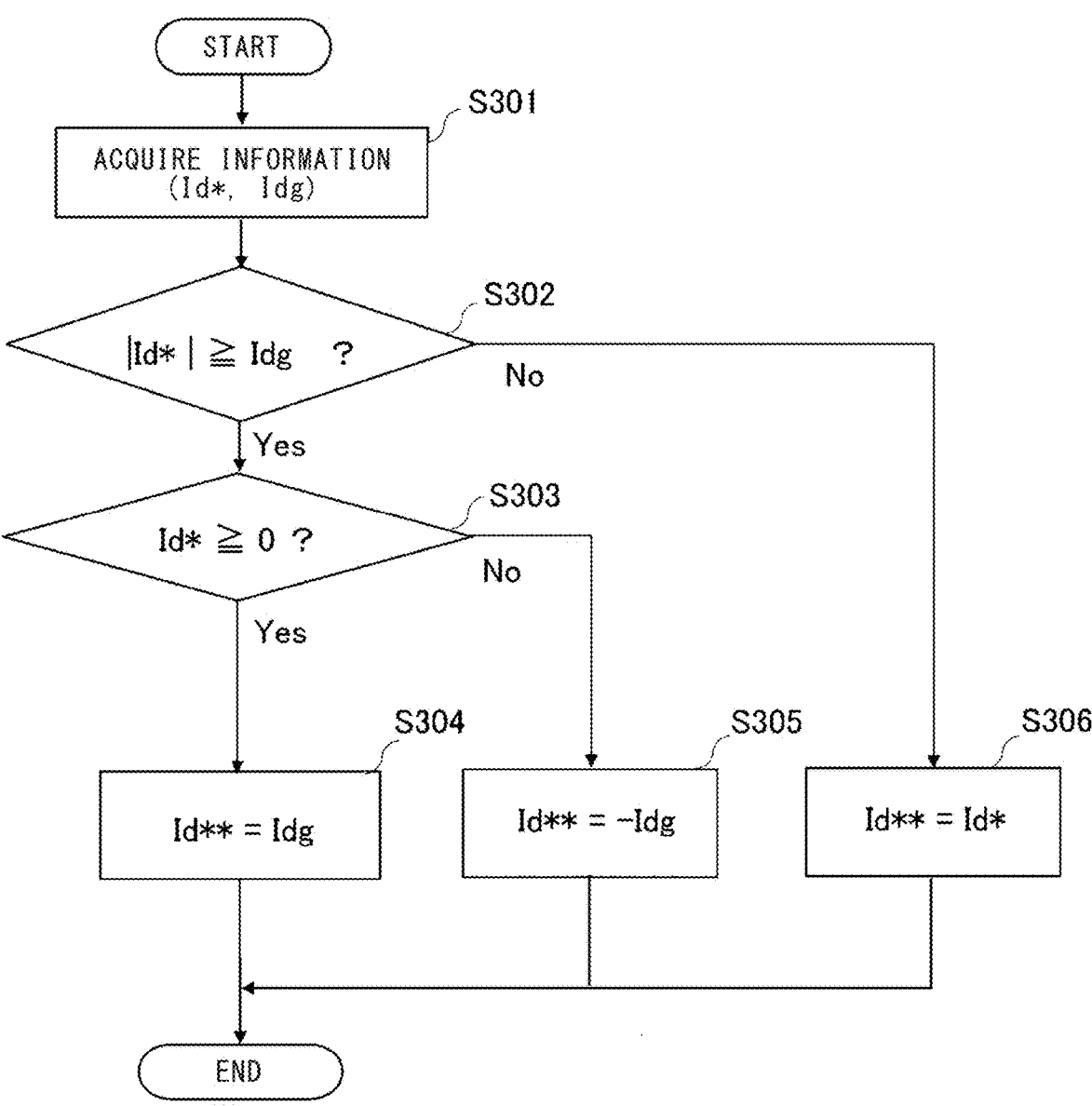
FIG. 9 is a flowchart showing operation in a d-axis current guard processing unit according to embodiment 1.

Next, such operation of the d-axis current guard processing unit 47 described above will be described with reference to a flowchart shown in FIG. 9.

First, in step S301, the reference d-axis current command value Id* and the d-axis current limitation value Idg are acquired as input information.

In step S302, whether or not the absolute value of the reference d-axis current command value Id* is equal to or greater than the d-axis current limitation value Idg is determined. If the absolute value of the reference d-axis current command value Id* is equal to or greater than the d-axis current limitation value Idg (Yes in step S302), the process proceeds to step S303.

In step S303, whether or not the reference d-axis current command value Id* is equal to or greater than 0 is determined. If the reference d-axis current command value Id* is equal to or greater than 0 (Yes in step S303), the process proceeds to step S304, to output the d-axis current limitation value Idg as the d-axis current command value Id**.

In step S303, if the reference d-axis current command value Id* is smaller than 0 (No in step S303), the process proceeds to step S305, to output −1×the d-axis current limitation value Idg as the d-axis current command value Id**.

In step S302, if the absolute value of the reference d-axis current command value Id* is smaller than the d-axis current limitation value Idg (No in step S302), the process proceeds to step S306, to output the reference d-axis current command value Id* as the d-axis current command value Id**.

As described above, by the d-axis current limitation value calculation unit 46 and the d-axis current guard processing unit 47, in a case where the absolute value of the control steering angle θs is equal to or greater than the second steering angle threshold θth2 and the steering is in a turning state, the d-axis current limitation value Idg which is the upper limit value of the absolute value of the reference d-axis current command value Id* before guard processing is reduced. Thus, the function of canceling out a magnetic flux of the rotor is suppressed, so that induced voltage reaches a voltage amplitude that can be applied to the motor 8, with a smaller absolute value of the rotation speed cm. As a result, a driver is prevented from performing a high-speed steering operation near the maximum steering angle and impact by end contact can be mitigated. That is, the "guard processing" in the d-axis current guard processing unit 47 is to calculate the d-axis current command value Id** so as to mitigate impact of end contact.

Next, the motor control signal calculation unit 33 will be described. In FIG. 2, the motor control signal calculation unit 33 receives the q-axis current command value Iq outputted from the q-axis current command value calculation unit 31, the d-axis current command value Id outputted from the d-axis current command value calculation unit 32, the control steering angle θs outputted from the control steering angle calculation unit 34, the steering angular velocity cos outputted from the rotation angular velocity axis conversion unit 36, the three-phase currents Iu, Iv, Iw detected by the current detection unit 22, and the rotation position θm of the motor 8 detected by the rotation position detection unit 21. Then, on the basis of the three-phase currents Iu, Iv, Iw and the rotation position θm of the motor 8, the motor control signal calculation unit 33 executes current feedback control in a d-q coordinate system, thereby calculating the phase voltage command values Vu*, Vv*, Vw* for u, v, and w phases.

In the motor control signal calculation unit 33, the three-phase currents Iu, Iv, Iw and the rotation position Gm of the motor 8 are inputted to the three-phase/two-phase conversion unit 49. Then, the three-phase/two-phase conversion unit 49 converts the three-phase currents Iu, Iv, Iw to a d-axis current value Id and a q-axis current value Iq which are actual current values in the d-q coordinate system.

The q-axis current command value Iq inputted to the motor control signal calculation unit 33 is inputted to an adder/subtractor 50a together with the q-axis current value Iq, whereby a q-axis current deviation ΔIq=Iq−Iq is calculated. On the other hand, the d-axis current command value Id is inputted to an adder/subtractor 50b together with the d-axis current value Id, whereby a d-axis current deviation ΔId=Id−Id is calculated. The q-axis current deviation ΔIq and the d-axis current deviation ΔId calculated as described above are inputted to respective feedback control units (hereinafter, referred to as FB control units) 51, 52.

The FB control units 51, 52 perform feedback control for causing the q-axis current value and the d-axis current value which are the respective actual current values to follow the q-axis current command value Iq and the d-axis current command value Id which are their respective target values. Specifically, the FB control units 51, 52 multiply the inputted q-axis current deviation ΔIq and d-axis current deviation ΔId by predetermined gains (PI gains) based on a constant of induced voltage and an inductance of the motor, thereby calculating a reference q-axis voltage command value Vq* as a reference before guard processing, and a d-axis voltage command value Vd*, respectively.

In the present embodiment, the reference q-axis voltage command value Vq* before guard processing is inputted to a voltage guard processing unit 55 together with a q-axis voltage limitation value Vqg calculated by the q-axis voltage limitation value calculation unit 53 described later, and the voltage guard processing unit 55 calculates the q-axis voltage command value Vq. Then, the q-axis voltage command value Vq is inputted to a two-phase/three-phase conversion unit 56 together with the d-axis voltage command value Vd* and the rotation position θm of the motor 8. The two-phase/three-phase conversion unit 56 calculates the phase voltage command values Vu*, Vv*, Vw* for u, v, and w phases.

The q-axis voltage limitation value calculation unit 53 receives the control steering angle θs and the steering angular velocity ωs. Then, the q-axis voltage limitation value calculation unit 53 has a q-axis voltage limitation value map 54 indicating the relationship between the absolute value |θs| of the control steering angle θs and the q-axis voltage limitation value Vqg, and calculates the q-axis voltage limitation value Vqg on the basis of the q-axis voltage limitation value map 54.

Figure 10:
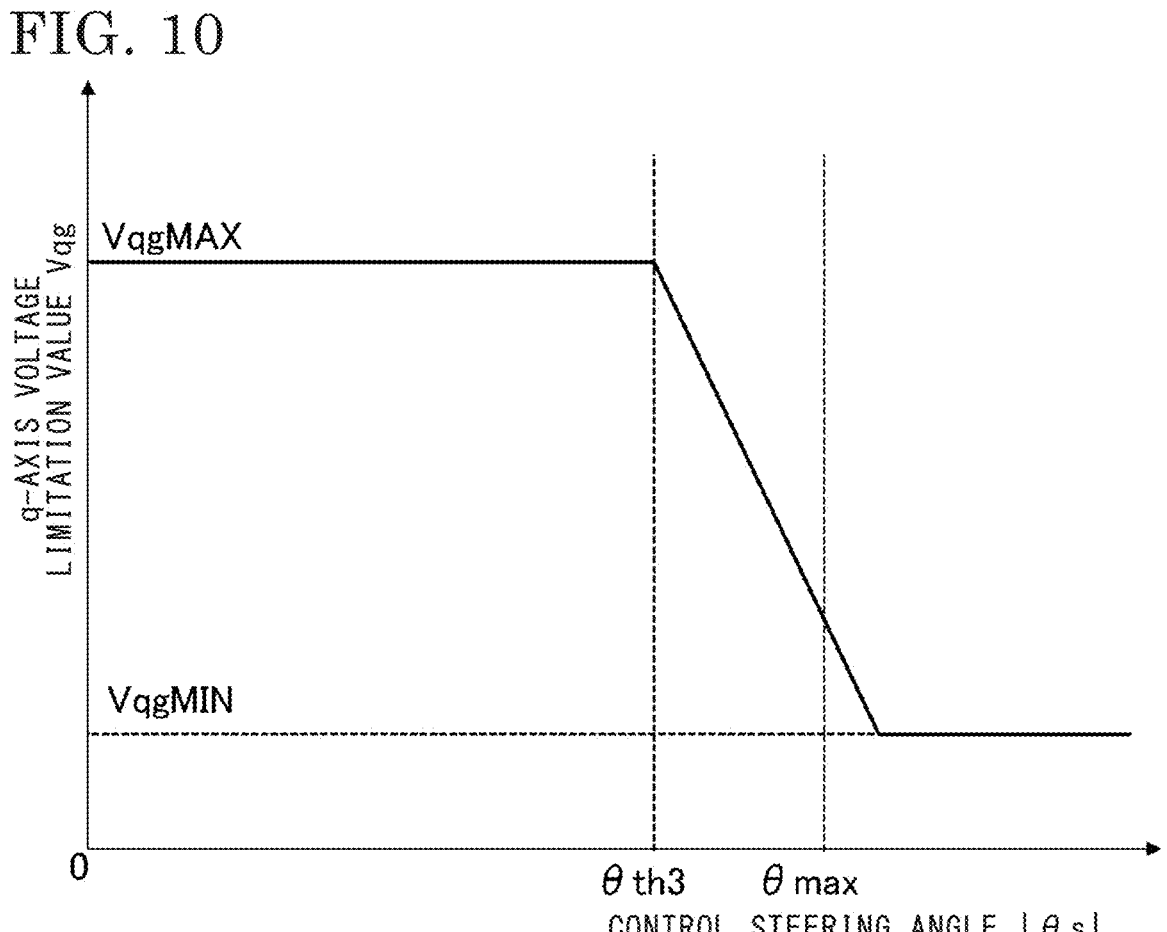
FIG. 10 shows an example of a q-axis voltage limitation value map provided in a q-axis voltage limitation value calculation unit according to embodiment 1.

FIG. 10 shows an example of the q-axis voltage limitation value map 54. As shown in FIG. 10, according to the q-axis voltage limitation value map, calculation is performed such that, in a case where the absolute value |θs| of the control steering angle θs is greater than a third steering angle threshold θth3 near the maximum steering angle θmax and the steering state of the steering 2 is a turning state, the q-axis voltage limitation value Vqg becomes smaller as the absolute value of the control steering angle θs becomes greater. Then, the calculation result of the q-axis voltage limitation value calculation unit 53 is outputted to the voltage guard processing unit 55. At this time, the minimum value of the q-axis voltage limitation value map 54 is set at VqgMIN. VqgMIN is set to be equal to or greater than a q-axis voltage value needed for the motor 8 to output rated current in a case of the rotation speed ωm=0.

In addition, calculation is performed such that, in a case where the absolute value |θs| of the control steering angle θs is equal to or smaller than the third steering angle threshold θth3 or the steering state of the steering 2 is a returning state, the q-axis voltage limitation value Vqg calculated by the q-axis voltage limitation value calculation unit 53 becomes a value VqgMAX greater than the absolute value of the maximum q-axis voltage value Vq that the motor 8 can output, and the calculated q-axis voltage limitation value Vqg is outputted to the voltage guard processing unit 55.

Figure 11A:
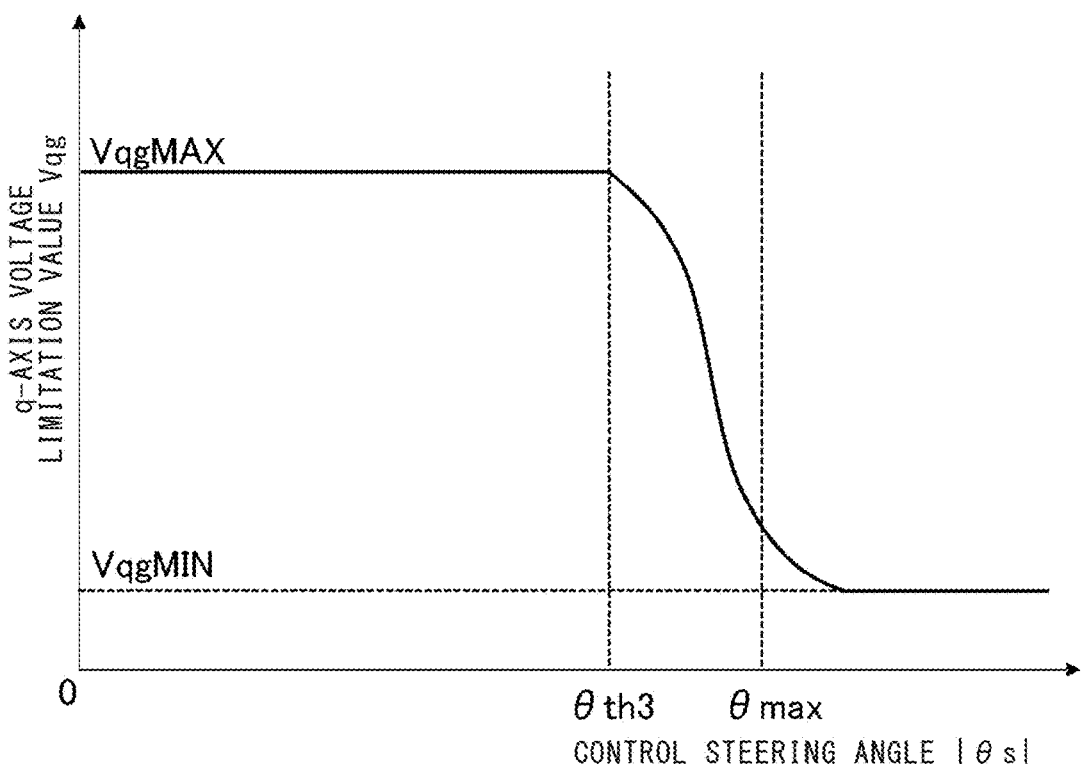
FIG. 11A shows another example of a q-axis voltage limitation value map provided in the q-axis voltage limitation value calculation unit according to embodiment 1.
Figure 11B:
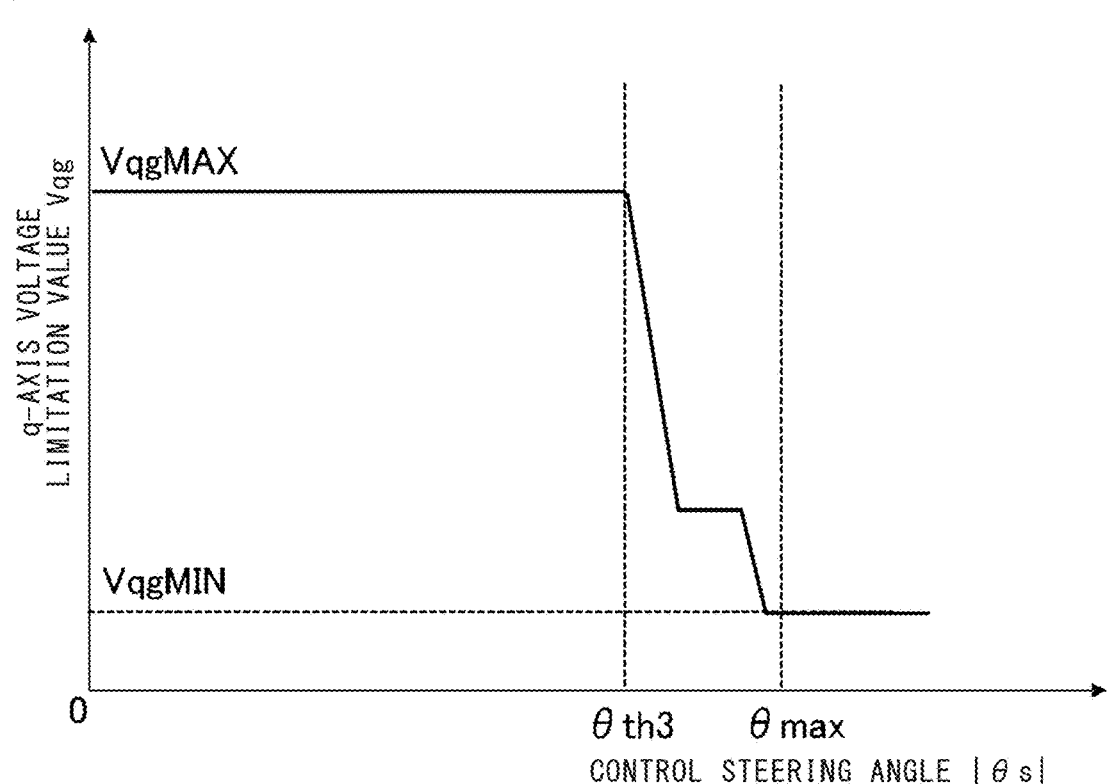
FIG. 11B shows still another example of a q-axis voltage limitation value map provided in the q-axis voltage limitation value calculation unit according to embodiment 1.

The q-axis voltage limitation value map 54 is not limited to the example shown in FIG. 10. FIG. 11A shows another example of the q-axis voltage limitation value map 54, and FIG. 11B shows still another example of the q-axis voltage limitation value map 54. As shown in FIG. 11A, setting may be made such that, as the absolute value of the control steering angle θs becomes greater, the q-axis voltage limitation value Vqg nonlinearly decreases from VqgMAX to VqgMIN. As shown in FIG. 11B, setting may be made such that, as the absolute value of the control steering angle $\theta s$ becomes greater, the q-axis voltage limitation value Vqg decreases stepwise in multiple stages from VqgMAX to VqgMIN. In a case where the control steering angle $\theta s$ is equal to or greater than the third steering angle threshold $\theta th3$, the q-axis voltage limitation value Vqg may be changed in one step from VqgMAX to VqgMIN, but gradually decreasing the q-axis voltage limitation value Vqg as the control steering angle $\theta s$ becomes greater as shown in FIG. 10 can more reduce impact in a steering operation.

The third steering angle threshold $\theta th3$ is set at an angle smaller than the first steering angle threshold $\theta th1$ and greater than the second steering angle threshold $\theta th2$. That is, from a state in which the absolute value of the control steering angle $\theta s$ is smaller than the first steering angle threshold $\theta th1$ and greater than the second steering angle threshold $\theta th2$, the q-axis voltage limitation value calculation unit 53 in the present embodiment calculates the q-axis voltage limitation value Vqg smaller than the absolute value of the maximum q-axis voltage value Vq that the motor 8 can output.

Figure 12:
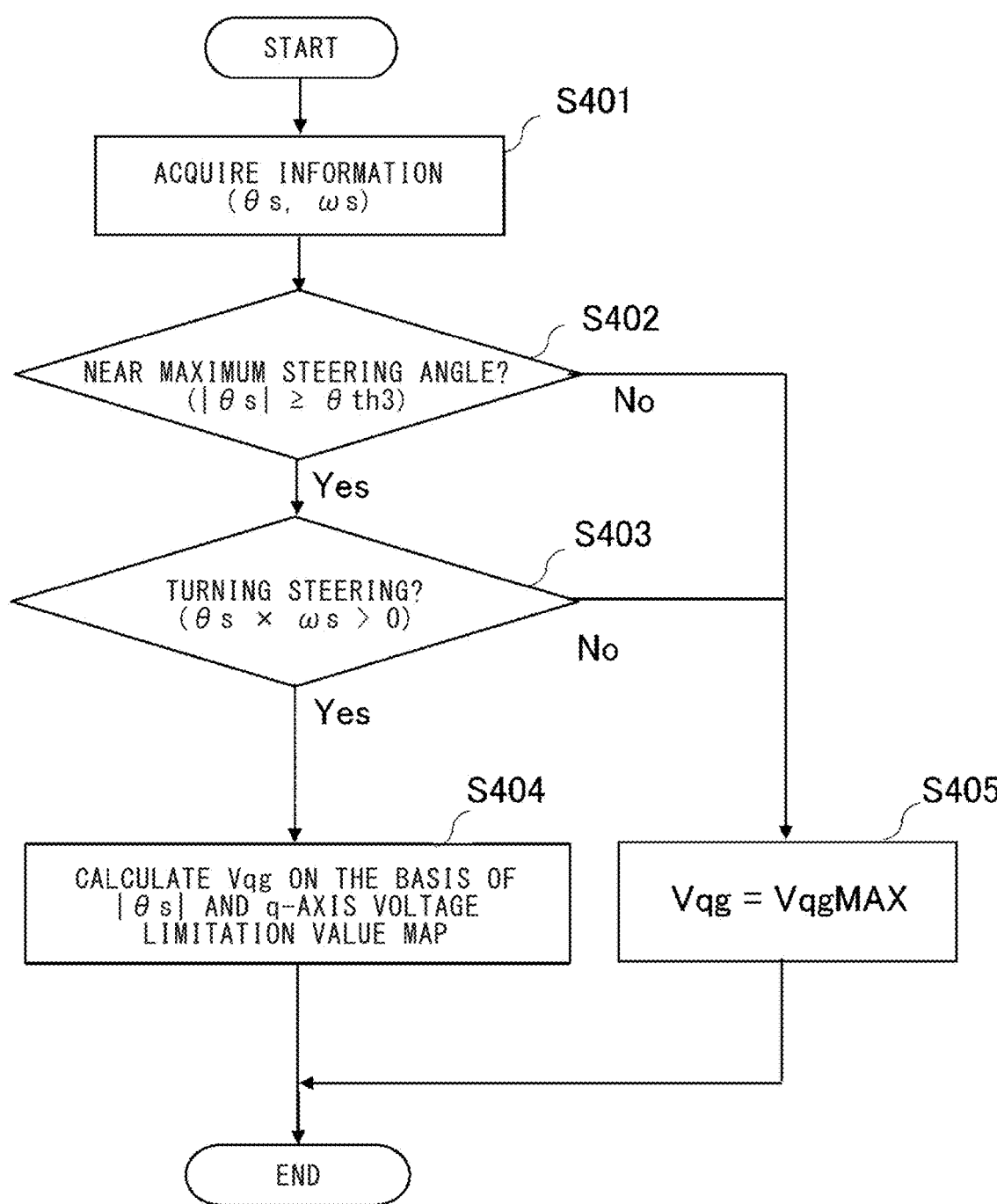
FIG. 12 is a flowchart showing operation in the q-axis voltage limitation value calculation unit according to embodiment 1.

Next, operation of the q-axis voltage limitation value calculation unit 53 will be described with reference to a flowchart shown in FIG. 12.

First, in step S401, the q-axis voltage limitation value calculation unit 53 acquires the control steering angle $\theta s$ and the steering angular velocity cos, as input information.

In step S402, whether or not the control steering angle $\theta s$ is near the maximum steering angle $\theta max$ is determined on the basis of whether or not the control steering angle $\theta s$ is equal to or greater than the third steering angle threshold $\theta th3$. Then, if the control steering angle $\theta s$ is equal to or greater than the third steering angle threshold $\theta th3$, it is determined that the control steering angle $\theta s$ is near the maximum steering angle $\theta max$ (Yes in step S402), thus proceeding to step S403.

In step S403, whether or not a steering-turning operation is being performed is determined on the basis of whether or not the control steering angle $\theta s \times$ the steering angular velocity $\omega s$ is greater than 0. Then, if the control steering angle $\theta s \times$ the steering angular velocity $\omega s$ is greater than 0, it is determined that a steering-turning operation is being performed (Yes in step S403), thus proceeding to step S404, in which a value calculated on the basis of the absolute value $|\theta s|$ of the control steering angle $\theta s$ and the q-axis voltage limitation value map 54 is outputted as the q-axis voltage limitation value Vqg.

In step S403, if the control steering angle $\theta s \times$ the steering angular velocity $\omega s$ is equal to or smaller than 0, it is determined that a steering-turning operation is not being performed (No in step S403), thus proceeding to step S405, in which the maximum q-axis voltage value VqgMAX that the motor 8 can output is outputted as the q-axis voltage limitation value Vqg.

In step S402, if the control steering angle $\theta s$ is smaller than the third steering angle threshold $\theta th3$ and the control steering angle $\theta s$ is not near the maximum steering angle $\theta max$ (No in step S402), the process proceeds to step S405, in which the maximum q-axis voltage value VqgMAX that the motor 8 can output is outputted as the q-axis voltage limitation value Vqg.

The voltage guard processing unit 55 receives the q-axis voltage limitation value Vqg in addition to the reference q-axis voltage command value Vq* before guard processing, and using these received values, the voltage guard processing unit 55 outputs the q-axis voltage command value Vq** as described below to the two-phase/three-phase conversion unit 56.

(1) In a case where the absolute value of the received reference q-axis voltage command value Vq* before guard processing is smaller than the q-axis voltage limitation value Vqg, the reference q-axis voltage command value Vq* before guard processing is directly outputted as the q-axis voltage command value Vq** to the two-phase/three-phase conversion unit 56.

(2) In a case where the absolute value of the received reference q-axis voltage command value Vq* before guard processing is equal to or greater than the q-axis voltage limitation value Vqg, the reference q-axis voltage command value Vq* before guard processing, whose absolute value is limited to the q-axis voltage limitation value Vqg, is outputted as the q-axis voltage command value Vq** to the two-phase/three-phase conversion unit 56.

That is, according to the above (1) and (2), the absolute value of the q-axis voltage command value Vq** outputted from the voltage guard processing unit 55 does not exceed the q-axis voltage limitation value Vqg.

Figure 13:
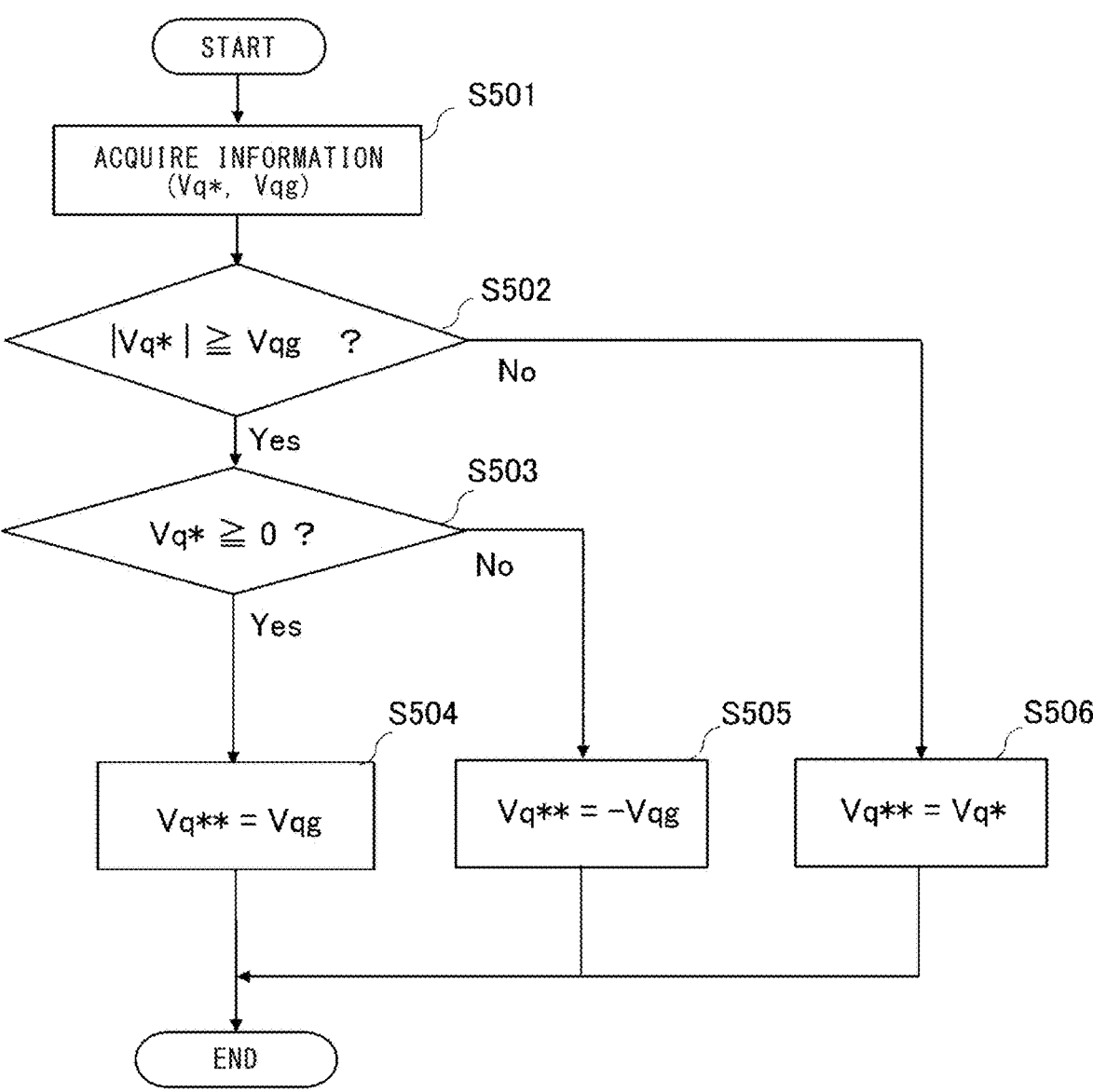
FIG. 13 is a flowchart showing operation in a voltage guard processing unit according to embodiment 1.

Next, such operation of the voltage guard processing unit 55 described above will be described with reference to a flowchart shown in FIG. 13.

First, in step S501, the voltage guard processing unit 55 acquires the reference q-axis voltage command value Vq* before guard processing and the q-axis voltage limitation value Vqg, as input information.

In step S502, whether or not the absolute value of the reference q-axis voltage command value Vq* before guard processing is equal to or greater than the q-axis voltage limitation value Vqg is determined. Then, if the absolute value of the reference q-axis voltage command value Vq* before guard processing is equal to or greater than the q-axis voltage limitation value Vqg (Yes in step S502), the process proceeds to step S503.

In step S503, whether or not the reference q-axis voltage command value Vq* before guard processing is equal to or greater than 0 is determined. Then, if the reference q-axis voltage command value Vq* before guard processing is equal to or greater than 0 (Yes in step S503), the process proceeds to step S504, to output the q-axis voltage limitation value Vqg as the q-axis voltage command value Vq**.

In step S503, if the reference q-axis voltage command value Vq* before guard processing is smaller than 0 (No in step S503), the process proceeds to step S505, to output $-1 \times$ the q-axis voltage limitation value Vqg as the q-axis voltage command value Vq**.

In step S502, if the absolute value of the reference q-axis voltage command value Vq* before guard processing is smaller than the q-axis voltage limitation value Vqg (No in step S502), the process proceeds to step S506, to output the reference q-axis voltage command value Vq* before guard processing as the q-axis voltage command value Vq**.

As described above, by the q-axis voltage limitation value calculation unit 53 and the voltage guard processing unit 55, in a case where the absolute value of the control steering angle $\theta s$ is equal to or greater than the third steering angle threshold $\theta th3$ and the steering is in a turning state, the q-axis voltage limitation value Vqg which is the upper limit value of the absolute value of the reference q-axis voltage command value Vq* before guard processing is reduced, whereby the voltage amplitude that can be applied to the motor 8 is reduced. Thus, induced voltage reaches the voltage amplitude that can be applied to the motor 8, with a smaller absolute value of the rotation speed $\omega m$, whereby a driver is prevented from performing a high-speed steering operation near the maximum steering angle and impact by end contact can be mitigated. That is, the "guard processing" in the voltage guard processing unit 55 is to calculate the q-axis voltage command value Vq** limited by the q-axis voltage limitation value Vqg so as to mitigate impact of end contact.

As described above, in the electric power steering device according to the present embodiment 1, the control device 4 includes the q-axis current command value calculation unit 31, the d-axis current command value calculation unit 32, and the motor control signal calculation unit 33, and the q-axis current command value calculation unit 31 includes the q-axis current guard processing unit 43 which calculates the q-axis current command value Iq so as to prevent a steering operation from being performed to the maximum steering angle θmax (steering end position), whereby impact of end contact can be mitigated. In addition, the d-axis current command value calculation unit 32 includes the d-axis current guard processing unit 47 which calculates the d-axis current command value Id so as to suppress a function of canceling out a magnetic flux of the rotor and prevent a driver from performing a high-speed steering operation near the maximum steering angle, whereby impact of end contact can be mitigated. Further, the motor control signal calculation unit 33 includes the voltage guard processing unit 55 which calculates the q-axis voltage command value Vq so as to reduce a voltage amplitude that can be applied to the motor 8** and prevent a driver from performing high-speed steering operation near the maximum steering angle, whereby impact of end contact can be mitigated. Thus, an effect that, even on a low μ road, impact of end contact can be mitigated and deterioration in a steering feeling can be prevented, is provided.

In addition, the q-axis current limitation value calculation unit 42 which calculates the q-axis current limitation value Iqg for limiting the base q-axis current command value Iq* before guard processing has, in advance, the q-axis current limitation value map 44 indicating the relationship between the absolute value |θs| of the control steering angle θs and the q-axis current limitation value Iqg, and thus can smoothly calculate and output the q-axis current limitation value Iqg to the q-axis current guard processing unit 43 on the basis of the map. The d-axis current limitation value calculation unit 46 which calculates the d-axis current limitation value Idg for limiting the reference d-axis current command value Id* before guard processing has, in advance, the d-axis current limitation value map 48 indicating the relationship between the absolute value |θs| of the control steering angle θs and the d-axis current limitation value Idg, and thus can smoothly calculate and output the d-axis current limitation value Idg to the d-axis current guard processing unit 47 on the basis of the map. The q-axis voltage limitation value calculation unit 53 which calculates the q-axis voltage limitation value Vqg for limiting the reference q-axis voltage command value Vq* before guard processing has, in advance, a map indicating the relationship between the absolute value |θs| of the control steering angle θs and the q-axis voltage limitation value Vqg, and thus can smoothly calculate and output the q-axis voltage limitation value Vqg to the voltage guard processing unit 55 on the basis of the map.

Embodiment 2

Hereinafter, an electric power steering device according to embodiment 2 will be described with reference to FIG. 14 to FIG. 16.

In the above embodiment 1, the q-axis voltage limitation value Vqg and the q-axis voltage command value Vq are calculated using the q-axis voltage limitation value calculation unit 53 and the voltage guard processing unit 55**, whereas in the present embodiment 2, another method will be described.

Figure 14:
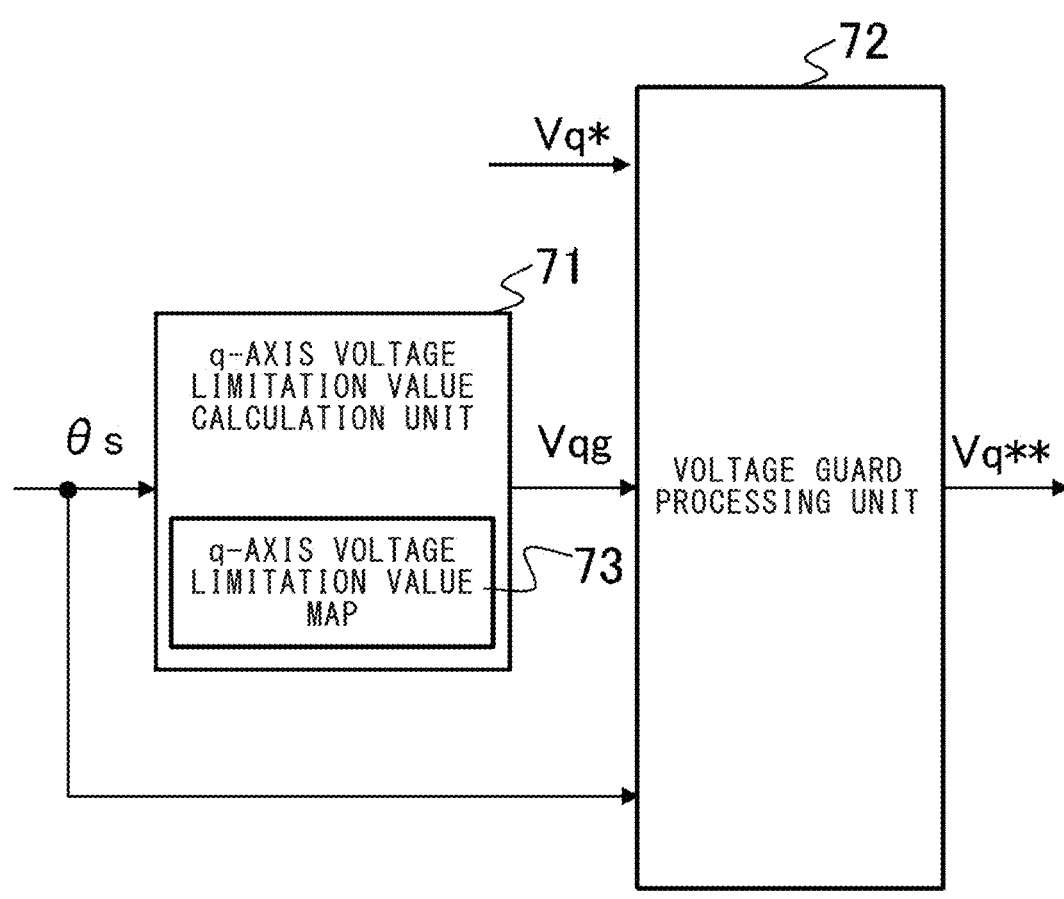
FIG. 14 is a block diagram showing a part of the configuration of a motor control signal calculation unit of an electric power steering device according to embodiment 2.

FIG. 14 is a block diagram showing a part of the configuration of the motor control signal calculation unit 33. In FIG. 14, a q-axis voltage limitation value calculation unit 71, a q-axis voltage limitation value map 73, and a voltage guard processing unit 72 are provided instead of the q-axis voltage limitation value calculation unit 53, the q-axis voltage limitation value map 54, and the voltage guard processing unit 55 shown in FIG. 2. The other configurations are the same as those in embodiment 1 and therefore the description thereof is omitted.

The q-axis voltage limitation value calculation unit 71 receives the control steering angle θs. Then, the q-axis voltage limitation value calculation unit 71 has the q-axis voltage limitation value map 73 indicating the relationship between the absolute value |θs| of the control steering angle θs and the q-axis voltage limitation value Vqg, and calculates the q-axis voltage limitation value Vqg on the basis of the q-axis voltage limitation value map 73.

Figure 15:
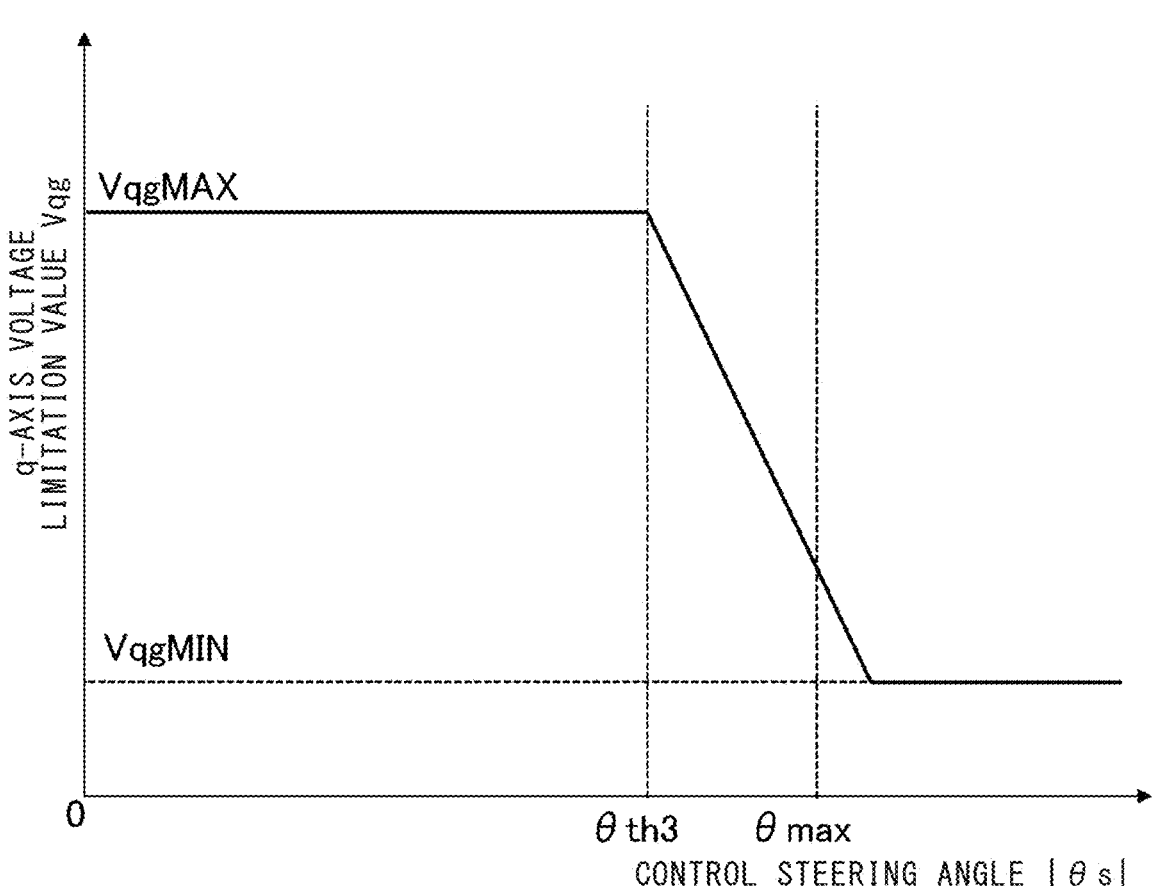
FIG. 15 shows an example of a q-axis voltage limitation value map provided in a q-axis voltage limitation value calculation unit according to embodiment 2.
Figure 16:
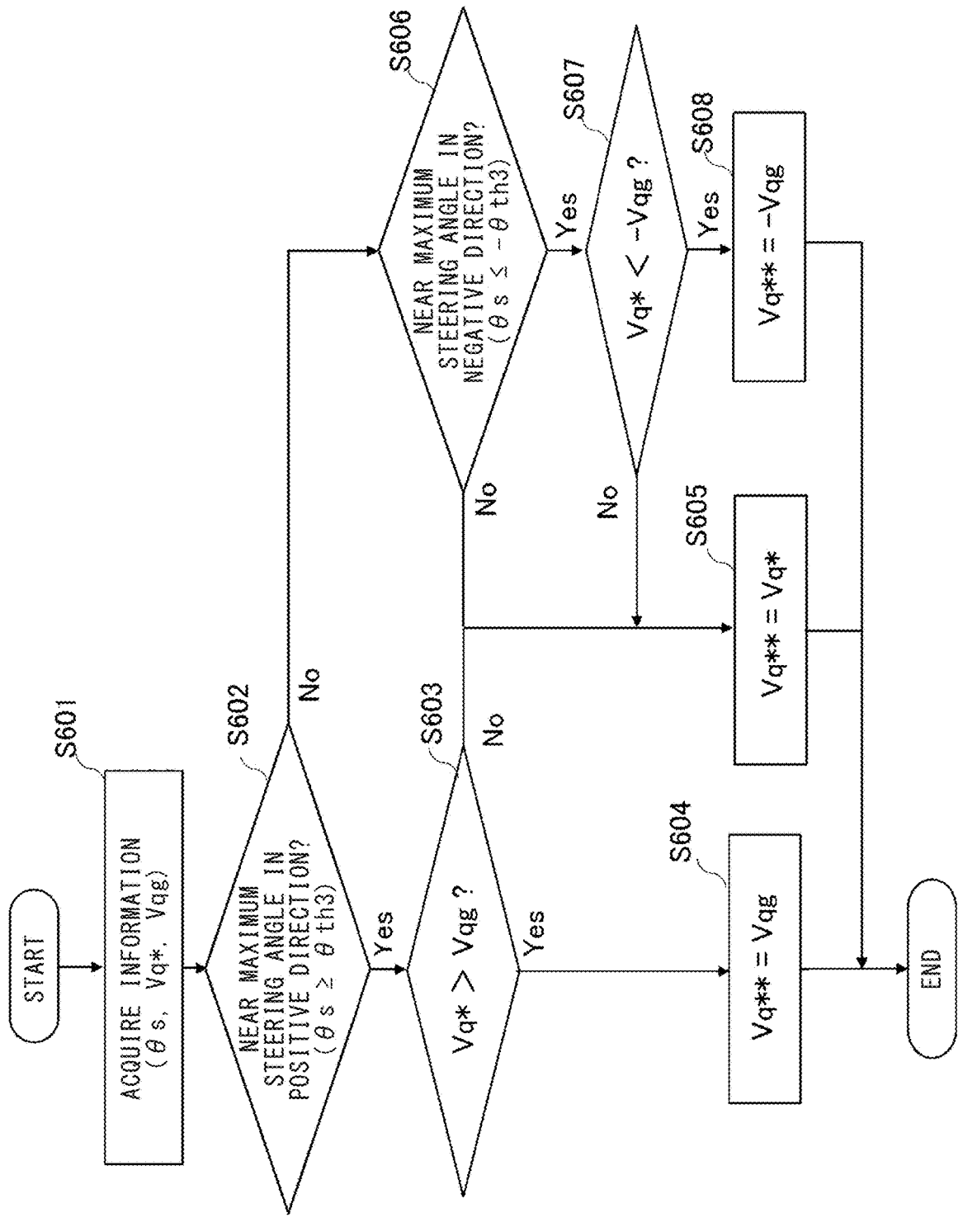
FIG. 16 is a flowchart showing operation in a voltage guard processing unit according to embodiment 2.

FIG. 15 shows an example of the q-axis voltage limitation value map 73. As shown in FIG. 15, calculation is performed such that, in a case where the absolute value |θs| of the control steering angle θs is greater than the third steering angle threshold θth3 near the maximum steering angle θmax, the q-axis voltage limitation value Vqg becomes smaller as the absolute value of the control steering angle θs becomes greater, and the calculated q-axis voltage limitation value Vqg is outputted to the voltage guard processing unit 72. At this time, the minimum value of the q-axis voltage limitation value map 73 is set at VqgMIN. VqgMIN is set to be equal to or greater than a q-axis voltage value needed for the motor 8 to output rated current in a case of the rotation speed ωm=0.

In addition, calculation is performed such that, in a case where the absolute value of the control steering angle θs is equal to or smaller than the third steering angle threshold θth3, the q-axis voltage limitation value Vqg calculated by the q-axis voltage limitation value calculation unit 71 becomes a value VqgMAX greater than the absolute value of the maximum q-axis voltage value that the motor 8 can output, and the calculated q-axis voltage limitation value Vqg is outputted to the voltage guard processing unit 72.

The voltage guard processing unit 72 receives the control steering angle θs in addition to the reference q-axis voltage command value Vq* before guard processing and the q-axis voltage limitation value Vqg, and using the received values, the voltage guard processing unit 72 outputs the q-axis voltage command value Vq as described below to the two-phase/three-phase conversion unit 56**.

(1) In a case where the received control steering angle θs is equal to or greater than the third steering angle threshold θth3 and the reference q-axis voltage command value Vq* before guard processing is greater than the q-axis voltage limitation value Vqg, the reference q-axis voltage command value Vq* before guard processing, which is limited to the q-axis voltage limitation value Vqg, is outputted as the q-axis voltage command value Vq to the two-phase/three-phase conversion unit 56**.

(2) In a case where the received control steering angle θs is equal to or greater than the third steering angle threshold θth3 and the reference q-axis voltage command value Vq* before guard processing is equal to or smaller than the q-axis voltage limitation value Vqg, the reference q-axis voltage command value Vq* before guard processing is directly outputted as the q-axis voltage command value Vq to the two-phase/three-phase conversion unit 56**.

(3) In a case where the received control steering angle θs is equal to or smaller than −1×the third steering angle threshold θth3 and the reference q-axis voltage command value Vq* before guard processing is smaller than −1×the q-axis voltage limitation value Vqg, the reference q-axis voltage command value Vq* before guard processing, which is limited to −1×the q-axis voltage limitation value Vqg, is outputted as the q-axis voltage command value Vq to the two-phase/three-phase conversion unit 56**.

(4) In a case where the received control steering angle θs is equal to or smaller than −1×the third steering angle threshold θth3 and the reference q-axis voltage command value Vq* before guard processing is equal to or greater than −1×the q-axis voltage limitation value Vqg, the reference q-axis voltage command value Vq* before guard processing is directly outputted as the q-axis voltage command value Vq to the two-phase/three-phase conversion unit 56**.

(5) In a case where the received control steering angle θs is smaller than the third steering angle threshold θth3 and greater than −1×the third steering angle threshold θth3, the reference q-axis voltage command value Vq* before guard processing is directly outputted as the q-axis voltage command value Vq to the two-phase/three-phase conversion unit 56**.

Next, such operation of the voltage guard processing unit 72 described above will be described with reference to a flowchart shown in FIG. 16.

First, in step S601, the voltage guard processing unit 72 acquires the control steering angle θs, the reference q-axis voltage command value Vq* before guard processing, and the q-axis voltage limitation value Vqg, as input information.

In step S602, whether or not the control steering angle θs is near the maximum steering angle θmax in the positive direction is determined on the basis of whether or not the control steering angle θs is equal to or greater than the third steering angle threshold θth3. Then, if the control steering angle θs is equal to or greater than the third steering angle threshold θth3, it is determined that the control steering angle θs is near the maximum steering angle θmax in the positive direction (Yes in step S602), thus proceeding to step S603.

In step S603, whether or not the reference q-axis voltage command value Vq* before guard processing is greater than the q-axis voltage limitation value Vqg is determined. Then, if the reference q-axis voltage command value Vq* before guard processing is greater than the q-axis voltage limitation value Vqg (Yes in step S603), the process proceeds to step S604, to output the q-axis voltage limitation value Vqg as the q-axis voltage command value Vq**.

In step S603, if the reference q-axis voltage command value Vq* before guard processing is equal to or smaller than the q-axis voltage limitation value Vqg (No in step S603), the process proceeds to step S605, to output the reference q-axis voltage command value Vq* before guard processing as the q-axis voltage command value Vq**.

In step S602, if the control steering angle θs is not near the maximum steering angle θmax in the positive direction, i.e., the control steering angle θs is smaller than the third steering angle threshold θth3 (No in step S602), the process proceeds to step S606.

In step S606, whether or not the control steering angle θs is near the maximum steering angle θmax in the negative direction is determined on the basis of whether or not the control steering angle θs is equal to or smaller than −1×the third steering angle threshold θth3. Then, if the control steering angle θs is equal to or smaller than −1×the third steering angle threshold θth3, it is determined that the control steering angle θs is near the maximum steering angle θmax in the negative direction (Yes in step S606), thus proceeding to step S607.

In step S607, whether or not the reference q-axis voltage command value Vq* before guard processing is smaller than −1×the q-axis voltage limitation value Vqg is determined. Then, if the reference q-axis voltage command value Vq* before guard processing is smaller than −1×the q-axis voltage limitation value Vqg (Yes in step S607), the process proceeds to step S608, to output −1×the q-axis voltage limitation value Vqg as the q-axis voltage command value Vq**.

In step S607, if the reference q-axis voltage command value Vq* before guard processing is equal to or greater than −1×the q-axis voltage limitation value Vqg (No in step S607), the process proceeds to step S605, to output the reference q-axis voltage command value Vq* before guard processing as the q-axis voltage command value Vq**.

In step S606, if the control steering angle θs is greater than −1×the third steering angle threshold θth3 (No in step S606), the process proceeds to step S605, to output the reference q-axis voltage command value Vq* before guard processing as the q-axis voltage command value Vq**.

As described above, by the q-axis voltage limitation value calculation unit 71 and the voltage guard processing unit 72, in a case where the control steering angle θs is equal to or greater than the third steering angle threshold θth3, the q-axis voltage limitation value Vqg which is the upper limit value of the reference q-axis voltage command value Vq* before guard processing is reduced, and in a case where the control steering angle θs is equal to or smaller than −1×the third steering angle threshold θth3, −1×the q-axis voltage limitation value Vqg which is the lower limit value of the reference q-axis voltage command value Vq* before guard processing is increased, whereby the voltage amplitude that can be applied to the motor 8 is reduced. Thus, induced voltage reaches the voltage amplitude that can be applied to the motor 8, with a small absolute value of the rotation speed ωm, whereby a driver is prevented from performing a high-speed steering operation near the maximum steering angle and impact by end contact can be mitigated.

The electric power steering device according to the present embodiment 2 provides the same effects as in embodiment 1. Hereinafter, an effect of mitigating impact due to end contact using the control device 4 included in the electric power steering device according to the present embodiment 2 will be described.

(1) In a case where the absolute value of the control steering angle θs is equal to or greater than the second steering angle threshold θth2 near the maximum steering angle θmax and the steering is in a turning state, by the d-axis current limitation value calculation unit 46 and the d-axis current guard processing unit 47, the d-axis current limitation value Idg which is the upper limit value of the absolute value of the reference d-axis current command value Id* before guard processing is reduced, thereby suppressing the function of canceling out a magnetic flux of the rotor.

(2) In a case where the absolute value of the control steering angle θs is equal to or greater than the third steering angle threshold θth3 greater than the second steering angle threshold θth2 and the steering is in a turning state, by the q-axis voltage limitation value calculation unit 71 and the voltage guard processing unit 72, the q-axis voltage limitation value Vqg which is the upper limit value of the absolute value of the reference q-axis voltage command value Vq* before guard processing is reduced. Thus, induced voltage reaches the voltage amplitude that can be applied to the motor 8, with a smaller absolute value of the rotation speed ωm, whereby a driver can be prevented from performing a high-speed steering operation near the maximum steering angle θmax.

(3) By the q-axis current limitation value calculation unit 42 and the q-axis current guard processing unit 43, in a case where the control steering angle θs is equal to or greater than the first steering angle threshold θth1, the q-axis current limitation value Iqg which is the upper limit value of the base q-axis current command value Iq* is reduced. Further, when the control steering angle θs comes close to the maximum steering angle θmax in the positive direction, limitation is performed so that the sign of the q-axis current limitation value Iqg becomes negative. On the other hand, in a case where the control steering angle θs is equal to or smaller than −1×the first steering angle threshold θth1, −1×the q-axis current limitation value Iqg which is the lower limit value of the base q-axis current command value Iq* is increased. Further, when the control steering angle θs comes close to the maximum steering angle −1×θmax in the negative direction, limitation is performed so that the sign of −1×the q-axis current limitation value Iqg becomes positive. Thus, the q-axis current command value Iq** is outputted in a direction opposite to the output direction of the steering torque Ts, to prevent a steering operation from being performed to the maximum steering angle θmax, whereby impact of end contact can be mitigated. Accordingly, an effect that, even on a low μ road, impact of end contact can be mitigated and deterioration in a steering feeling can be prevented, is provided.

Regarding the q-axis current limitation value calculation unit 42 and the q-axis current guard processing unit 43, the d-axis current limitation value calculation unit 46 and the d-axis current guard processing unit 47, or the q-axis voltage limitation value calculation unit 71 and the voltage guard processing unit 72, either of these units may be applied alone, thus providing the corresponding one of the above effects.

When the control steering angle θs comes close to the maximum steering angle θmax, it is possible to mitigate impact of end contact by reducing the upper limit value of the absolute value of the q-axis current command value Iq even if the sign of the q-axis current command value Iq is not reversed (IqgMIN>0). However, when the sign of the q-axis current command value Iq** is reversed, such torque that cancels out a driver's steering force is generated, whereby a steering operation is readily prevented from being performed to the maximum steering angle θmax.

Embodiment 3

Hereinafter, an electric power steering device according to embodiment 3 will be described with reference to FIG. 17.

In the above embodiment 1, Idg is calculated on the basis of the d-axis current limitation value map 48 shown in FIG. 6, FIG. 7A, or FIG. 7B, whereas in the present embodiment 3, another method will be described.

Figure 17:
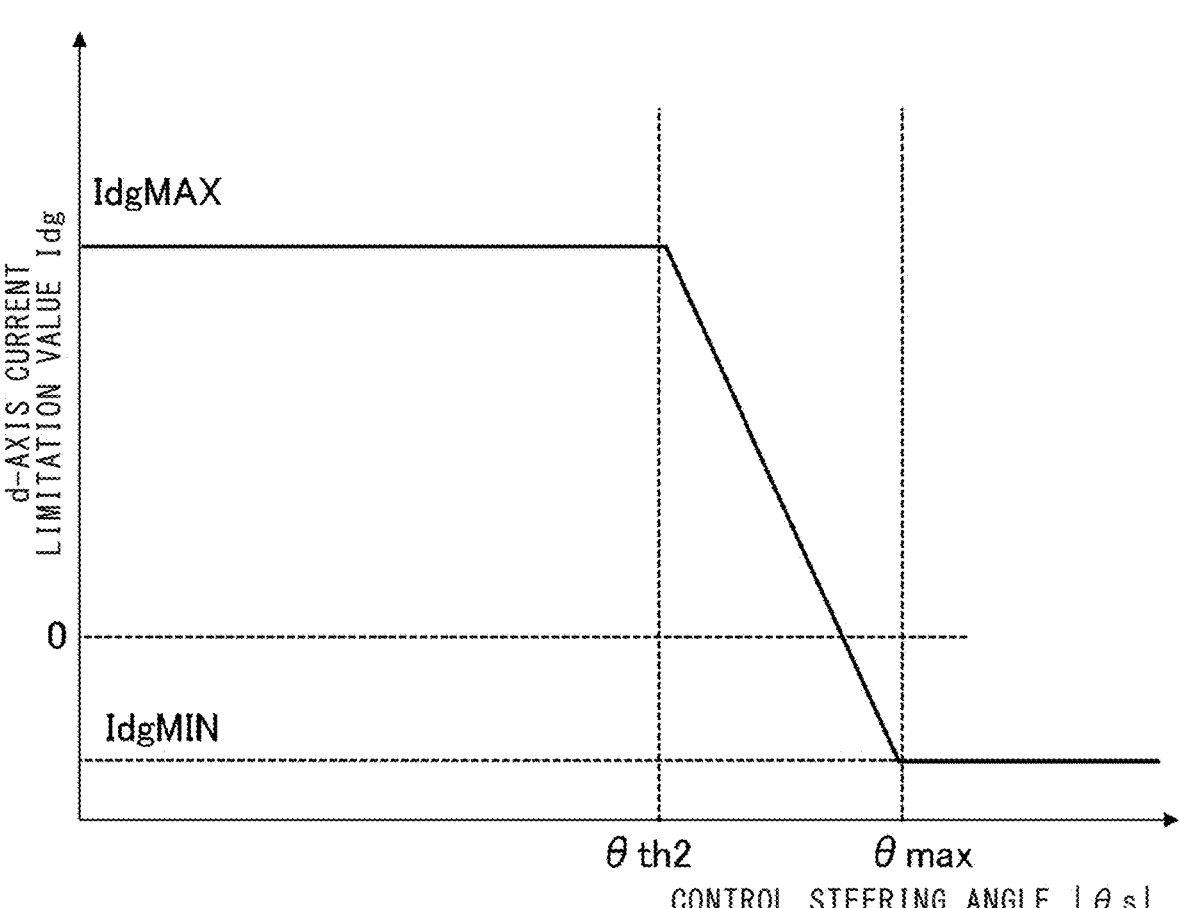
FIG. 17 shows an example of a d-axis current limitation value map provided in a d-axis current limitation value calculation unit according to embodiment 3.

FIG. 17 shows another example of the d-axis current limitation value map 48 that the d-axis current limitation value calculation unit 46 has. As shown in FIG. 17, calculation is performed such that, in a case where the absolute value |θs| of the control steering angle θs is greater than the second steering angle threshold θth2 near the maximum steering angle θmax, and the steering state of the steering 2 is a turning state in which the steering angular velocity ωs>0 is satisfied while the control steering angle θs is greater than 0, or a turning state in which the steering angular velocity ωs<0 is satisfied while the control steering angle θs is smaller than 0, the d-axis current limitation value Idg becomes smaller as the absolute value |θs| of the control steering angle θs becomes greater. Further, calculation is performed such that, between the second steering angle threshold θth2 and the maximum steering angle θmax, the d-axis current limitation value Idg decreases to a negative value, reaching the d-axis current limitation value IdgMIN. The calculated d-axis current limitation value Idg is outputted to the d-axis current guard processing unit 47. At this time, the minimum value of the d-axis current limitation value map 48 is set at the d-axis current limitation value minimum value IdgMIN, and the absolute value of the d-axis current limitation value minimum value IdgMIN is set to be equal to or smaller than a d-axis current value needed for the motor 8 to output rated current.

In a case where the d-axis current limitation value Idg is calculated as a negative value in the d-axis current limitation value calculation unit 46 and the reference d-axis current command value Id* is smaller than 0, the d-axis current guard processing unit 47 outputs the d-axis current command value Id as a positive value to the motor control signal calculation unit 33. Thus, a magnetic flux of the rotor is increased, whereby induced voltage reaches the voltage amplitude that can be applied to the motor 8**, with a smaller absolute value of the rotation speed ωm as compared to embodiment 1. As a result, a driver is prevented from performing a high-speed steering operation near the maximum steering angle and impact by end contact can be mitigated.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 electric power steering device
2 steering
3 torque sensor
4 control device
5 CPU
6 ROM
7 RAM
8 motor
9 power converter
11 steering shaft

12 rack-and-pinion mechanism
13 rack shaft
14 rack housing
15 column shaft
16 intermediate shaft
17 pinion shaft
18 rack end
19 tie rod
20 front wheel
21 rotation position detection unit
22 current detection unit
31 q-axis current command value calculation unit
32 d-axis current command value calculation unit
33 motor control signal calculation unit
34 control steering angle calculation unit
35 differentiator
36 rotation angular velocity axis conversion unit
41 base current command value calculation unit
42 q-axis current limitation value calculation unit
43 q-axis current guard processing unit
44 q-axis current limitation value map
45 reference d-axis current command value calculation unit
46 d-axis current limitation value calculation unit
47 d-axis current guard processing unit
48 d-axis current limitation value map
49 three-phase/two-phase conversion unit
50*a*, 50*b* adder/subtractor
51, 52 FB control unit
53 q-axis voltage limitation value calculation unit
54 q-axis voltage limitation value map
55 voltage guard processing unit
56 two-phase/three-phase conversion unit
71 q-axis voltage limitation value calculation unit
72 voltage guard processing unit
73 q-axis voltage limitation value map

The invention claimed is:

1. An electric power steering device comprising a control device configured to calculate a current command value on the basis of steering torque given through an operation of a steering shaft and to calculate a voltage command value on the basis of the current command value, and a power converter configured to supply a motor with power converted on the basis of the voltage command value outputted from the control device, the electric power steering device being configured to generate assist torque to the steering shaft by driving of the motor, wherein the control device includes a q-axis current command value calculation circuitry and a d-axis current command value calculation circuitry configured to calculate the current command value, a motor control signal calculation circuitry configured to calculate the voltage command value on the basis of a q-axis current command value calculated by the q-axis current command value calculation circuitry and a d-axis current command value calculated by the d-axis current command value calculation circuitry, and a control steering angle calculation circuitry configured to calculate a steering angle of the steering shaft on the basis of a rotation position of the motor, the q-axis current command value calculation circuitry includes a base current command value calculation circuitry configured to calculate a base q-axis current command value as a reference, on the basis of the steering torque, a q-axis current limitation value calculation circuitry configured to calculate a q-axis current limitation value such that, in a case where an absolute value of the steering angle calculated by the control steering angle calculation circuitry is equal to or greater than a predetermined first steering angle threshold, the q-axis current limitation value decreases with increase in the absolute value of the steering angle and becomes a negative value toward a maximum steering angle, and a q-axis current guard processing circuitry configured to receive the base q-axis current command value calculated by the base current command value calculation circuitry and the q-axis current limitation value calculated by the q-axis current limitation value calculation circuitry, the q-axis current guard processing circuitry is configured to, in a case where the steering angle is equal to or greater than the first steering angle threshold and the base q-axis current command value is greater than the q-axis current limitation value, set the q-axis current command value on the basis of the q-axis current limitation value instead of the base q-axis current command value, the q-axis current guard processing circuitry is configured to, in a case where the steering angle is equal to or smaller than −1×the first steering angle threshold and the base q-axis current command value is smaller than −1×the q-axis current limitation value, set the q-axis current command value on the basis of −1×the q-axis current limitation value instead of the base q-axis current command value, the q-axis current guard processing circuitry is configured to output the q-axis current command value to the motor control signal calculation circuitry, and wherein the control device further comprises one or more processors configured to implement the q-axis current command value calculation circuitry, the d-axis current command value calculation circuitry, the motor control signal calculation circuitry and the control steering angle calculation circuitry.

2. The electric power steering device according to claim 1, wherein the q-axis current guard processing circuitry is configured to, in a case where the steering angle is equal to or greater than the first steering angle threshold and the base q-axis current command value is equal to or smaller than the q-axis current limitation value, or in a case where the steering angle is equal to or smaller than −1×the first steering angle threshold and the base q-axis current command value is equal to or greater than −1×the q-axis current limitation value, set the base q-axis current command value as the q-axis current command value.

3. An electric power steering device comprising a control device configured to calculate a current command value on the basis of steering torque given through an operation of a steering shaft and to calculate a voltage command value on the basis of the current command value, a power converter configured to supply a motor with power converted on the basis of the voltage command value outputted from the control device, and a current detector configured to detect current supplied to the motor, the electric power steering device being configured to generate assist torque to the steering shaft by driving of the motor, wherein the control device includes a q-axis current command value calculation circuitry and a d-axis current command value calculation circuitry configured to calculate the current command value, a motor control signal calculation circuitry configured to calculate the voltage command value on the basis of a q-axis current command value calculated by the q-axis current command value calculation circuitry and a d-axis current command value calculated by the d-axis current command value calculation circuitry, and a control steering angle calculation circuitry configured to calculate a steering angle of the steering shaft on the basis of a rotation position of the motor, the q-axis current command value calculation circuitry includes a base current command value calculation circuitry configured to calculate a base q-axis current command value as a reference, on the basis of the steering torque, a q-axis current limitation value calculation circuitry configured to calculate a q-axis current limitation value such that, in a case where an absolute value of the steering angle calculated by the control steering angle calculation circuitry is equal to or greater than a predetermined first steering angle threshold, the q-axis current limitation value decreases with increase in the absolute value of the steering angle, and a q-axis current guard processing circuitry configured to receive the base q-axis current command value calculated by the base current command value calculation circuitry and the q-axis current limitation value calculated by the q-axis current limitation value calculation circuitry, the q-axis current guard processing circuitry is configured to, in a case where the steering angle is equal to or greater than the first steering angle threshold and the base q-axis current command value is greater than the q-axis current limitation value, set the q-axis current command value on the basis of the q-axis current limitation value instead of the base q-axis current command value, the q-axis current guard processing circuitry is configured to, in a case where the steering angle is equal to or smaller than $-1 \times$ the first steering angle threshold and the base q-axis current command value is smaller than $-1 \times$ the q-axis current limitation value, set the q-axis current command value on the basis of $-1 \times$ the q-axis current limitation value instead of the base q-axis current command value, the q-axis current guard processing circuitry is configured to output the q-axis current command value to the motor control signal calculation circuitry, and the motor control signal calculation circuitry includes a feedback control circuitry configured to acquire actual q-axis current and actual d-axis current by converting the current detected by the current detector, and to calculate a reference voltage command value as a reference for causing the actual q-axis current and the actual d-axis current to respectively follow the q-axis current command value inputted from the q-axis current command value calculation circuitry and the d-axis current command value inputted from the d-axis current command value calculation circuitry, a voltage limitation value calculation circuitry configured to calculate a voltage limitation value such that, in a case where the absolute value of the steering angle calculated by the control steering angle calculation circuitry is equal to or greater than a predetermined second steering angle threshold smaller than the first steering angle threshold and a product of the steering angle and an angular velocity of the steering shaft is positive, the voltage limitation value decreases with increase in the absolute value of the steering angle, and in a case where the absolute value of the steering angle is smaller than the second steering angle threshold or the product of the steering angle and the angular velocity of the steering shaft is equal to or smaller than 0, the voltage limitation value becomes equal to or greater than maximum voltage that the motor can output, a voltage guard processing circuitry configured to receive the reference voltage command value calculated by the feedback control circuitry and the voltage limitation value calculated by the voltage limitation value calculation circuitry, and to output the voltage command value so that an absolute value of the voltage command value does not exceed the voltage limitation value, and wherein the control device further comprises one or more processors configured to implement the q-axis current command value calculation circuitry, the d-axis current command value calculation circuitry, the motor control signal calculation circuitry and the control steering angle calculation circuitry.

4. The electric power steering device according to claim 3, wherein the d-axis current command value calculation circuitry includes a reference d-axis current command value calculation circuitry configured to calculate a reference d-axis current command value on the basis of the q-axis current command value outputted from the q-axis current command value calculation circuitry and a rotation speed of the motor, a d-axis current limitation value calculation circuitry configured to calculate a d-axis current limitation value such that, in a case where the absolute value of the steering angle is equal to or greater than a predetermined third steering angle threshold smaller than the first steering angle threshold and a product of the steering angle and an angular velocity of the steering shaft is positive, the d-axis current limitation value decreases with increase in the absolute value of the steering angle, and in a case where the absolute value of the steering angle is smaller than the third steering angle threshold or the product of the steering angle and the angular velocity of the steering shaft is equal to or smaller than 0, the d-axis current limitation value becomes equal to or greater than an absolute value of a maximum d-axis current value that the motor can output, and a d-axis current guard processing circuitry configured to set the d-axis current command value so that an absolute value of the d-axis current command value does not exceed the d-axis current limitation value.

5. The electric power steering device according to claim 4, wherein the third steering angle threshold is set to be smaller than the first steering angle threshold and the second steering angle threshold.

6. An electric power steering device comprising a control device configured to calculate a current command value on the basis of steering torque given through an operation of a steering shaft and to calculate a voltage command value on the basis of the current command value, a power converter configured to supply a motor with power converted on the basis of the voltage command value outputted from the control device, and a current detector configured to detect current supplied to the motor, the electric power steering device being configured to generate assist torque to the steering shaft by driving of the motor, wherein the control device includes
    a q-axis current command value calculation circuitry and a d-axis current command value calculation circuitry configured to calculate the current command value,
    a motor control signal calculation circuitry configured to calculate the voltage command value on the basis of a q-axis current command value calculated by the q-axis current command value calculation circuitry and a d-axis current command value calculated by the d-axis current command value calculation circuitry, and
    a control steering angle calculation circuitry configured to calculate a steering angle of the steering shaft on the basis of a rotation position of the motor,
the q-axis current command value calculation circuitry includes
    a base current command value calculation circuitry configured to calculate a base q-axis current command value as a reference, on the basis of the steering torque,
    a q-axis current limitation value calculation circuitry configured to calculate a q-axis current limitation value such that, in a case where an absolute value of the steering angle calculated by the control steering angle calculation circuitry is equal to or greater than a predetermined first steering angle threshold, the q-axis current limitation value decreases with increase in the absolute value of the steering angle, and
    a q-axis current guard processing circuitry configured to receive the base q-axis current command value calculated by the base current command value calculation circuitry and the q-axis current limitation value calculated by the q-axis current limitation value calculation circuitry,
the q-axis current guard processing circuitry is configured to, in a case where the steering angle is equal to or greater than the first steering angle threshold and the base q-axis current command value is greater than the q-axis current limitation value, set the q-axis current command value on the basis of the q-axis current limitation value instead of the base q-axis current command value,
the q-axis current guard processing circuitry is configured to, in a case where the steering angle is equal to or smaller than −1×the first steering angle threshold and the base q-axis current command value is smaller than −1×the q-axis current limitation value, set the q-axis current command value on the basis of −1×the q-axis current limitation value instead of the base q-axis current command value, the q-axis current guard processing circuitry is configured to output the q-axis current command value to the motor control signal calculation circuitry,
the motor control signal calculation circuitry includes
    a feedback control circuitry configured to acquire actual q-axis current and actual d-axis current by converting the current detected by the current detection circuitry, and to calculate a reference voltage command value as a reference for causing the actual q-axis current and the actual d-axis current to respectively follow the q-axis current command value inputted from the q-axis current command value calculation circuitry and the d-axis current command value inputted from the d-axis current command value calculation circuitry,
    a voltage limitation value calculation circuitry configured to calculate a voltage limitation value such that, in a case where the absolute value of the steering angle calculated by the control steering angle calculation circuitry is equal to or greater than a predetermined second steering angle threshold smaller than the first steering angle threshold, the voltage limitation value decreases with increase in the absolute value of the steering angle, and
    a voltage guard processing circuitry configured to receive the reference voltage command value calculated by the feedback control circuitry and the voltage limitation value calculated by the voltage limitation value calculation circuitry,
the voltage guard processing circuitry is configured to, in a case where the steering angle is equal to or greater than the second steering angle threshold and the reference voltage command value is greater than the voltage limitation value, output, as the voltage command value, the voltage limitation value instead of the reference voltage command value,
the voltage guard processing circuitry is configured to, in a case where the steering angle is equal to or smaller than −1×the second steering angle threshold and the reference voltage command value is smaller than −1×the voltage limitation value, output, as the voltage command value, −1×the voltage limitation value instead of the reference voltage command value, and
wherein the control device further comprises one or more processors configured to implement the q-axis current command value calculation circuitry, the d-axis current command value calculation circuitry, the motor control signal calculation circuitry and the control steering angle calculation circuitry.

7. The electric power steering device according to claim 6, wherein
    the d-axis current command value calculation circuitry includes
        a reference d-axis current command value calculation circuitry configured to calculate a reference d-axis current command value on the basis of the q-axis current command value outputted from the q-axis current command value calculation circuitry and a rotation speed of the motor,
        a d-axis current limitation value calculation circuitry configured to calculate a d-axis current limitation value such that, in a case where the absolute value of the steering angle is equal to or greater than a predetermined third steering angle threshold smaller than the first steering angle threshold and a product of the steering angle and an angular velocity of the steering shaft is positive, the d-axis current limitation value decreases with increase in the absolute value of the steering angle, and in a case where the absolute value of the steering angle is smaller than the third steering angle threshold or the product of the steering angle and the angular velocity of the steering shaft is equal to or smaller than 0, the d-axis current limitation value becomes equal to or greater than an absolute value of a maximum d-axis current value that the motor can output, and a d-axis current guard processing circuitry configured to set the d-axis current command value so that an absolute value of the d-axis current command value does not exceed the d-axis current limitation value.

8. The electric power steering device according to claim 7, wherein the third steering angle threshold is set to be smaller than the first steering angle threshold and the second steering angle threshold.

\* \* \* \* \*